(12) United States Patent
Jackson et al.

(10) Patent No.: US 11,979,796 B2
(45) Date of Patent: *May 7, 2024

(54) LABOR NOTIFICATION SYSTEM AND METHOD

(71) Applicant: STORC LLC, Washington, DC (US)

(72) Inventors: Pamela Renee Jackson, Washington, DC (US); Jessica L. Howard Jackson, Washington, DC (US)

(73) Assignee: STORC LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,614

(22) Filed: Mar. 7, 2023

(65) Prior Publication Data
US 2023/0224676 A1    Jul. 13, 2023

Related U.S. Application Data

(63) Continuation of application No. 17/105,936, filed on Nov. 27, 2020, now Pat. No. 11,617,058.
(Continued)

(51) Int. Cl.
*H04W 4/029* (2018.01)
*G08G 1/0967* (2006.01)
*H04W 4/90* (2018.01)

(52) U.S. Cl.
CPC ...... *H04W 4/029* (2018.02); *G08G 1/096716* (2013.01); *G08G 1/096775* (2013.01); *H04W 4/90* (2018.02)

(58) Field of Classification Search
CPC .............................. H04W 4/029; H04W 4/02
(Continued)

(56) References Cited

U.S. PATENT DOCUMENTS 7,706,967 B2 *  4/2010  Knockeart ....... G08G 1/096872
                                                    701/119
8,350,721 B2 *  1/2013  Carr ..................... G08G 1/0965
                                                    701/422

(Continued)

OTHER PUBLICATIONS

Non-Final Office Action on U.S. Appl. No. 17/105,936 dated Oct. 27, 2022.
(Continued)

*Primary Examiner* — Qutbuddin Ghulamali
(74) *Attorney, Agent, or Firm* — Foley & Lardner LLP

(57) ABSTRACT

A system for facilitating communication in regard to a user in labor may include a first electronic device associated with the user, a set of second electronic devices associated with emergency contacts, and a server. The server may be configured to retrieve coordinates of a predetermined location, a current position of the user, and vehicle information corresponding to a vehicle in which the user is traveling to the predetermined location. The server may transmit a command to activate an electronic sign associated with the vehicle to indicate the labor status. The server may transmit a first notification including the vehicle information and an estimated time of arrival to the one or more second electronic devices. The server may determine whether the user is in an emergency state and output a second notification including information related to the emergency state to the one or more second electronic devices.

10 Claims, 18 Drawing Sheets

Related U.S. Application Data

(60) Provisional application No. 62/942,628, filed on Dec. 2, 2019.

(58) Field of Classification Search
USPC .................................................. 455/404.2
See application file for complete search history.

(56) References Cited

U.S. PATENT DOCUMENTS

| | | | |
|---|---|---|---|
| 10,176,715 B2* | 1/2019 | Hansen | G08G 1/096844 |
| 11,094,195 B2* | 8/2021 | Corbacio | B60W 30/0953 |
| 2007/0200658 A1* | 8/2007 | Yang | H04L 12/2827 |
| | | | 398/112 |
| 2020/0082723 A1* | 3/2020 | Corbacio | G08G 1/0965 |
| 2020/0242922 A1* | 7/2020 | Dulberg | B60W 40/00 |

OTHER PUBLICATIONS

Notice of Allowance on U.S. Appl. No. 17/105,936 dated Nov. 30, 2022.
Trademark Official Gazette, Serial No. 88710573 for STORC filed Nov. 29, 2019, published for opposition Jun. 9, 2020 (2 pages).

* cited by examiner

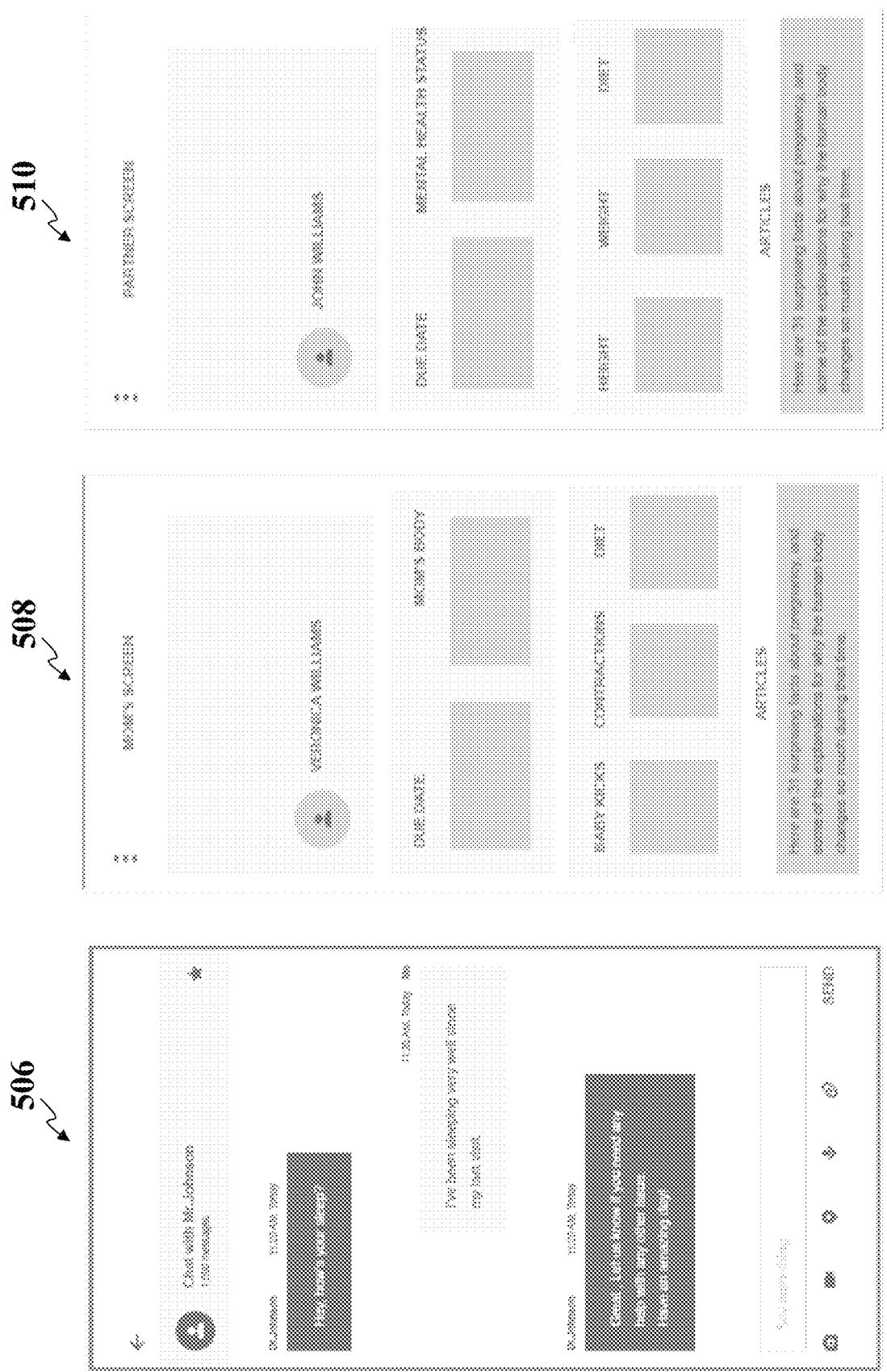

LABOR NOTIFICATION SYSTEM AND METHOD

CROSS-REFERENCE TO RELATED APPLICATION(S)

The present application is a continuation of U.S. patent application Ser. No. 17/105,936, filed Nov. 27, 2020, which claims the benefit of priority to U.S. Provisional Application No. 62/942,628 filed Dec. 2, 2019, the entire contents of which are incorporated herein by reference.

FIELD

The present disclosure relates generally to subject monitoring via mobile application. More specifically, the present disclosure relates to monitoring and alerting status of a user via the use of a mobile application on an electronic device.

BACKGROUND

Persons entering labor may have limited options with respect to transportation to a clinic or medical care setting where delivery is intended to take place. Further, options for communicating transit status and other information are limited.

SUMMARY

The present disclosure relates to systems and methods for notifications concerning a subject in labor. In some embodiments, the present disclosure relates to communication of the status of a person in labor prior to, during, or after transit.

Women in labor face various challenges in reaching a medical care setting where delivery is intended to take place. For example, an ambulance ride may be undesirable because it relies on the ability of an operator to arrive on scene in time and can come with a costly hospital bill, but clearly communicates to others on the road the urgency of the situation. In contrast, using a personal vehicle provides the flexibility of the mother to be transported at a chosen time, but cannot communicate or signal to other drivers that the passengers require medical attention. In addition, such vehicles could be stopped by law enforcement for speeding. Exemplary embodiments described herein seek to provide a solution to the above-noted problems through the use of a mobile application and signage configured to notify family members and emergency services to streamline the travel of a mother en route to a care provider.

At least one embodiment relates to a system for facilitating communication in regard to a user in labor, the system comprising a first electronic device associated with the user, a set of one or more second electronic devices associated with a predetermined set of one or more emergency contacts, and a server including a processor. The processor is configured to, responsive to receiving a change in labor status as a user input from the first electronic device, retrieve coordinates of a predetermined location, a current position of the user, and vehicle information corresponding to a vehicle in which the user is traveling to the predetermined location; transmit a command to activate an electronic sign associated with the vehicle, the electronic sign configured to indicate the labor status; determine, using a global positioning system, an estimated time of arrival of the user at the predetermined location using the current position of the user; transmit a first notification including the vehicle information and the estimated time of arrival to the one or more second electronic devices; collect biometric data of the user using one or more sensors; determine whether the user is in an emergency state based on the biometric data; and when the user is determined to be in the emergency state, output a second notification including information related to the emergency state to the one or more second electronic devices.

Another embodiment relates to a non-transitory computer readable medium configured to store instructions which, when executed by a processor of a first electronic device, cause the processor to, responsive to receiving a change in maternal labor status as a user input from a first electronic device, retrieve coordinates of a predetermined location, a current position of the user, and vehicle information corresponding to a vehicle in which the user is traveling to the predetermined location; transmit a command to activate an electronic sign associated with the vehicle, the electronic sign configured to indicate the maternal labor status; determine, using a global positioning system, an estimated time of arrival of the user at the predetermined location using the current position of the user; transmit a first notification including the vehicle information and the estimated time of arrival to one or more second electronic devices associated with emergency contacts, the one or more second electronic devices communicatively coupled to the first electronic device; collect biometric data of the user using one or more sensors coupled to the processor; determine whether the user is in an emergency state based on the biometric data; and when the user is determined to be in the emergency state, output a second notification including information related to the emergency state to the one or more second electronic devices.

Another embodiment relates to a method of alerting transport of a user in maternal labor, the method comprising responsive to receiving, from a first electronic device, a change in labor status as a user input, retrieving coordinates of a predetermined location, a current position of the user, and vehicle information corresponding to a vehicle in which the user is traveling to the predetermined location; transmitting a command to activate an electronic sign associated with the vehicle, the electronic sign configured to indicate the labor status; determining, by the first electronic device, an estimated time of arrival of the user at the predetermined location using the current position of the user; transmitting, by the first electronic device, a first notification including the vehicle information and the estimated time of arrival to one or more second electronic devices, wherein the one or more second electronic devices are communicatively coupled to the first electronic device and are associated with a predetermined set of one or more emergency contacts; continuously collecting, by the first electronic device, biometric data of the user; determining, by the first electronic device, whether the user is in an emergency state based on the biometric data; and outputting, by the first electronic device, a second notification including the emergency state to the one or more second electronic devices in response to determining that the user is in the emergency state.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, the systems and methods described herein are directed toward alerting predetermined personnel of a user in labor. The systems and methods herein provide the benefit of timely notifications to the predetermined personnel detailing the labor and travel progress of a user en route to a care provider (e.g., hospital, clinic, birthing center, etc.).

The predetermined personnel may include family members, care provider staff or medical personnel, emergency medical services (EMS) or the like. In some embodiments, to decrease the likelihood of interference from law enforcement during an emergency trip to a care provider in a non-emergency vehicle, the systems and methods described herein provide for notifying law enforcement that a user is traveling along a predetermined route to a care provider in a particular vehicle. Moreover, the systems and methods may include collecting and monitoring biometric data of the user. The biometric data may be used to protect a user's personal identifiable information, and, in some embodiments, to detect and report a possible emergency status of the user to EMS or other medical personnel prior to arrival of the user at the care provider.

Figure 1:
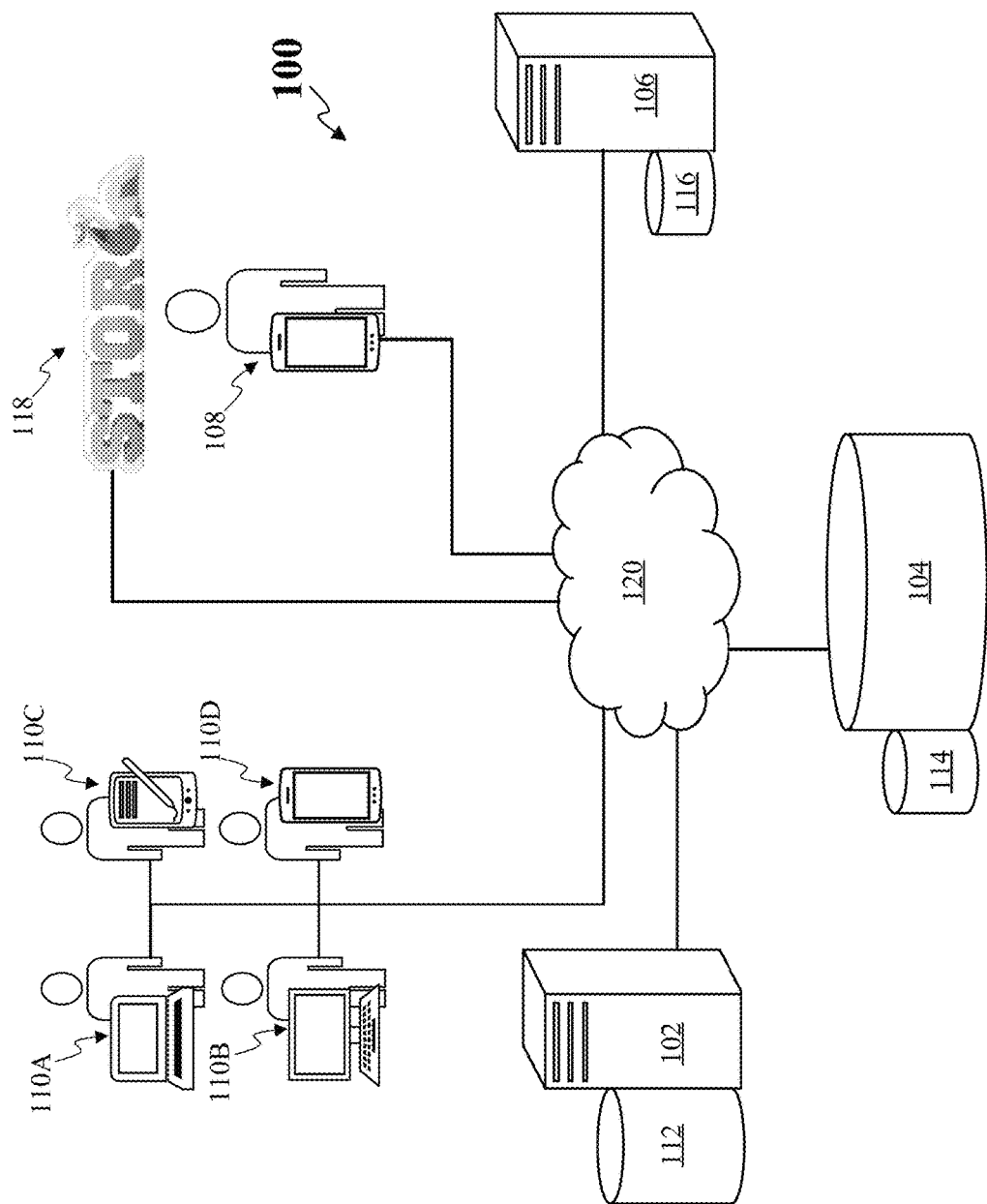
FIG. 1 is a block diagram illustrating an example system for facilitating communication in regard to a user in labor, according to an embodiment.

FIG. 1 is a block diagram illustrating various components of a system 100 for facilitating communication of a status of a user in labor, according to an embodiment. System 100 is a non-limiting example of a computer system having various features that can be utilized to monitor a user status through a user-computing device 108 and notify multiple electronic devices (e.g., client computing devices 110A through 110D) in response to a change in the user status. In some embodiments, the notifications may be generated automatically by a main server 102 in response to receiving a change in user status detected by user-computing device 108 (e.g., biometric data identifying a change in heart rate or blood pressure), or may be generated in response to a user input changing the user status (e.g., an input changing a labor status to positive). System 100 also includes a sign 118 configured to be activated by the user when interacting with user-computing device 108 (e.g., the input changing the labor status to positive).

The methods and systems described herein apply to generating various notifications to be sent to a set of client computing devices 110A through 110D based on a status of a user in labor that is monitored by user-computing device 108. These notifications may be received as web-based notifications (e.g., push notifications on a smart phone), mobile application notifications, or as third party messages. In addition to generating notifications, the application may be configured to display a graphical user interface generated by a main server 102 on user-computing device 108 or client computing devices 110A through 110D. Though the two graphical interfaces may appear different and provide different functionalities based on the type of user (e.g., user, family member, medical personnel), for purposes of this disclosure (unless otherwise noted) the application will be described from the perspective of user-computing device 108. The application functionalities may be hosted by main server 102 or a webserver 106. In some embodiments, webserver 106 may act as a liaison to generate web-based content for displaying the application, which may be retrieved in response to a request from main server 102. For example, when main server 102 generates an interactive graphical user interface, it may include requests for additional web-based content that may be fulfilled by webserver 106. The features of system 100 communicate via a network 120 to transmit and fulfill requests for content for eventual display on user-computing device 108.

In some embodiments, the system 100 may operate in a cloud-computing environment where the user-computing device 108 may be cloud-optimized. The user-computing device 108 data may execute the application and access graphical user interfaces generated by main server 102. The graphical user interfaces generated by main server 102 (e.g., services provided by main server 102) may be stored and executed on a remote cloud-based main server 102 accessed over a network cloud. In the cloud-computing environment, a web browser on the user-computing device 108 may interface with an application program associated with main server 102, which is executed remotely via cloud-based technology.

Main server 102 may be any computing device capable of performing the actions described herein. For instance, main server 102 may include a processing unit, and a non-transitory machine-readable storage medium. The processing unit may include a processor with a computer-readable medium, such as a random access memory coupled to the processor. Main server 102 may be executing algorithms or computer executable program instructions, which may be executed by a single processor or multiple processors in a distributed configuration. Main server 102 may be configured to interact with one or more software modules of a same or a different type operating within the system 100.

Non-limiting examples of the processor may include a microprocessor, an application specific integrated circuit, and a field programmable object array, among others. Main server 102 is capable of executing data processing tasks, data analysis tasks, and valuation tasks. Non-limiting examples of main server 102 may include a desktop computer, a server computer, a laptop computer, a tablet computer, and the like. For ease of explanation, the FIG. 1 depicts a single server computing device functioning as main server 102. However, some embodiments may include a plurality of server computing devices capable of performing various tasks described herein. An exemplary non-limiting embodiment of a configuration of main server 102 will be described further with reference to FIG. 2.

System 100 may operate in a local computing environment where user-computing device 108 executes the application (e.g., a mobile or internal application) to access an electronic platform generated/hosted by a third party webserver (e.g., webserver 106). An example of an electronic platform may be a website accessible through the mobile or internal application. For instance, the user-computing device 108 may execute an internal application hosted or generated by webserver 106. User-computing device may be a smart phone, tablet, personal computer, or another personal computing device. Even though some embodiments described herein focus on an internal application hosted by the webserver, the methods and systems described herein are not limited to such. For instance, webserver 106 may also host/generate a website accessible by user-computing device 108 via a browser application. Main server 102 and/or webserver 106 may display the graphical user interfaces generated by main server 102 in a manner that is indistinguishable from the website hosted by the webserver 106. For instance, the graphical user interfaces generated by main server 102 may be implemented/embedded within the website generated/hosted by the webserver 106, such that they share the same look and feel.

The webserver 106 may be a computing device hosting a website (or any other electronic platform) accessible to the user-computing device 108 via the network 202. The webserver 106 may include a processing unit and non-transitory machine-readable storage capable of executing various tasks described herein. The processing unit may include a processor with a computer-readable medium, such as a random access memory coupled to the processor. Non-limiting examples of the processor may include a microprocessor, an application specific integrated circuit, and a field programmable object array, among others. Non-limiting examples of the webserver 106 may include workstation computers, laptop computers, server computers, and the like. While the system 100 includes a single webserver 106, in some embodiments the webserver 106 may include a number of computing devices operating in a distributed computing environment.

The webserver 106 may be executing algorithms or computer executable program instructions, which may be executed by a single processor or multiple processors in a distributed configuration. The webserver 106 may be configured to interact with one or more software modules of a same or a different type operating within the system 100. For instance, the webserver 106 may execute software applications configured to host an electronic platform, which may generate and serve various webpages to the user-computing device 108. The electronic platform may also embed various graphical user interfaces generated by main server 102.

The webserver 106 may execute software applications configured to display the user interfaces described herein (e.g., host a website that displays graphical user interfaces generated by main server 102), which may generate and serve various webpages to user-computing device 108. Main server 102 and/or the webserver 106 may be configured to require user authentication based upon a set of user authorization credentials (e.g., username, password, biometrics, cryptographic certificate, and the like). In such implementations, main server 102 and/or the webserver 106 may access a system database (e.g., database 104) configured to store user credentials, which main server 102 and/or the webserver 106 may be configured to reference in order to determine whether a set of entered credentials (purportedly authenticating the user) match an appropriate set of credentials that identify and authenticate the user.

Main server 102 and/or the webserver 106 may generate and host webpages onto the user-computing device 108 based upon a user's role within the system 100. In such implementations, the user's role may be defined by data fields and input fields in user records stored in the database 104. Main server 102 and/or the webserver 106 may authenticate the user and may identify the user's role by executing an access directory protocol (e.g., LDAP).

The webserver 106 may generate and serve webpages to the user-computing device 108 based upon information associated with the user and structure of the interactive graphical user interface of the user-computing device 108. The information associated with the user may be defined by data fields in user records stored in local memory. The webserver 106 may conduct an authentication of the user by executing an access directory protocol. Upon authentication, the webserver 106 may generate the webpages as described herein.

Main server 102 and/or webserver 106 support several general functionalities of the application, such as displaying a calendar tracking pregnancy milestones, doctor appointments, and pregnancy or birthing classes. The application may include several pages to display information related to a medical history of the user, a medical history of the pregnancy (e.g., previous complications, doctor visits, etc.), a list of emergency contacts specific to the user, and recent biometric values of the user and associated typical ranges. In some embodiments, the application may act as an interface through which the user may communicate with emergency contacts regarding pregnancy milestones or progress, and may generate reminders to schedule check-ups at predetermined intervals to facilitate pregnancy progress monitoring by medical professionals. Main server 102 and/or webserver 106 may monitor the user's interactions with the pages generated by main server 102. For instance, main server 102 and/or the webserver 106 may record data input by the user, and may perform processing of the data to generate the notifications and store the recorded data to a database 104.

Main server 102 and webserver 106 may utilize database 104, to store and/or retrieve information related to the user such as medical history, family history, pregnancy progress, emergency contact information, or other information within the database 104 that the main server 102 may use to determine whether the user has entered an emergency state. Database 104 may have a logical construct of data files, which are stored in non-transitory machine-readable storage media, such as a hard disk or memory, controlled by software modules of a database program (e.g., SQL), and a database management system that executes the code modules (e.g., SQL scripts) for various data queries and management functions. Even though the database 104 is shown as a separate computing feature, the database 104 may be a part of a computing environment that includes the webserver 106.

In database 104, each set of data may have a corresponding user identifier that may be entered as a username coupled with a password that the user may enter to the application on user-computing device 108 to access the user data stored in database 104. For instance, main server 102 may receive, from user-computing device 108, an input including personal data, which may be obtained through an interactive form including questions targeted at gathering user information. Database 104 may further store the questions as a dataset. In some embodiments, the dataset may identify a corresponding electronic form (e.g., a first form for gathering family history, a second form for gathering emergency contact information). When main server 102 receives a request from the user-computing device 108 and/or the webserver 106 to display said forms, main server 102 may query the database 104 and retrieves the corresponding dataset. Main server 102 may then display the forms and record the responses input by the user as a data record associated with the user.

In some embodiments, main server 102 may utilize a second local database (e.g. database 112) in conjunction with database 104 in the following ways. Database 112 may store question information, and database 104 may be a remote database (or cloud storage) configured to store user information, such that the answers are stored separate from the answers for each user, thereby separating the information so that it may be protected. In a non-limiting example, database 112 may store general information such as a typical pregnancy timeline populated with reminders for when check-ups should occur. The user-specific data may be stored in database 104, and may be retrieved by main server 102 in order to compare a user calendar to the typical timeline stored in local database 112 in order to generate reminders to the user to schedule particular appointments.

Main server 102 may use various application programming interfaces (APIs) to communicate with different features described herein. An API, as used herein, refers to a computing interface that uses connector programming code to act as a software intermediary between at least two computing components/features described herein. The API may automatically and/or periodically transfer various calls, instructions, and/or requests among different features of system 100. Using different APIs, main server 102 may automatically transmit and/or receive calls and instructions. For instance, main server 102 may use an API 116 to communicate with the webserver 106, such that when a user operating the user-computing device 108 submits or requests information, API 116 automatically transmits the information or the instruction to main server 102. Main server 102 may also use an API 114 to communicate with the database 104.

API 114 and/or 116 may be two-way APIs. A two-way API refers to an API that allows information to be transmitted back and forth between at least two features of the system 100. For instance, when a user operating the user-computing device 108 submits data or a request to generate notifications via the mobile application hosted by the webserver 106, API 116 may generate a command instructing main server 102 to generate and transmit the notifications to client computing devices 110A through 110D. The command may include data associated with the user requesting the notifications, and the contact information of each emergency contact associated with each of client computing devices 110A through 110D.

Additionally or alternatively, main server may use a content delivery network (CDN) to ensure data integrity when communicating with different features described in the system 100. A CDN, as described herein, refers to a distributed delivery network of proxy servers/nodes that uses multi-layered delivery methods/systems to transmit data (e.g., Akamai). Main server 102 may use a CDN when communicating various calls/instructions with the webserver 106 (directly or via the API 116) and/or the database 104 (directly or via the API 114).

The user-computing device 108 is a computing device including a processing unit. The processing unit may execute the application that accesses or receives data records from the database 104. The processing unit may include a processor with computer-readable medium, such as a random access memory coupled to the processor. The user-computing device 108 may be configured to run algorithms or computer executable program instructions, which may be executed by a single processor or multiple processors in a distributed configuration. The user-computing device 108 may interact with one or more software modules of a same or a different type operating within the system 100. In some embodiments, the user-computing device 108 may be operable via a battery and/or connectable to a power supply. In some embodiments, the user-computing device 108 may chargeable wirelessly (for example, via Bluetooth).

User-computing device 108 may be a smart phone device operated by a main user, and may be configured to collect data related to the user such as biometric data (e.g., heart rate, blood pressure, etc.) and position data (e.g., geographical coordinates), as well receive inputs from the user detailing data related to a user vehicle, emergency contact information, and a care provider location. In some embodiments, the position data may be a user's home address that is used as a default location of a user, but is not limited to such. The position data may be obtained via a global positioning system (GPS) able to pinpoint a position of user-computing device 108. This may be achieved through interaction with main server 102, webserver 106, or an additional server not shown configured to triangulate positions of devices connected to a particular network. Main server 102 and/or webserver 106 may use the position data of the user-computing device 108 and the care provider to determine a travel route and an estimated time of arrival (ETA). In some embodiments, main server 102 and/or webserver 106 may utilize a map application native to user-computing device 108 to determine the travel route and the ETA.

The user may be able to input information relating to a vehicle that may be operated by the user or a family member to transport the user to a care provider at the time of labor or well in advance. The vehicle information may include tag information, driver's license information, a make, model and color of the vehicle, or any additional information necessary to identify the vehicle. The user may also be able to submit information regarding emergency contacts, such as the contact information of a care provider manager, an obstetrician/gynecologist and close family members or friends. In some embodiments, the contact information may further include contact information for local law enforcement, emergency medical services (EMS) or other personnel the user would like to notify at a time of labor. Such information may be input to user-computing device 108 in advance such that the notification can be automatically generated for the list of contacts and include the information pre-entered by the user and stored by database 102. This eases the burden of the user to communicate to each and every party the information included in the notification by storing the information well in advance of the user's labor. As such, when the user inputs a change in status, such as "in labor" or "en route to care provider" to user-computing device 108, host server 102 may receive the input and generate the notifications using the information stored in database 102 without further input from the user.

The biometric data collected by user-computing device 108 may be obtained through a series of sensors (not shown), which may be integrated with user-computing device 108 or may be connected to user-computing device 108 via wireless connection such as WiFi or Bluetooth connection. The biometric data is collected for fingerprint recognition, facial recognition, voice pattern recognition, or the like, and is used to authenticate the user accessing the mobile application. In this way, any personal identifiable information (PII) stored in the application is protected from view by anyone but the user. For example, user-computing device 108 may require a password, fingerprint recognition, facial recognition, voice pattern recognition, or the like in order to grant access to a user. This data may be stored in database 104 or in database 112, and is used to authenticate the user each time the mobile application is accessed via user-computing device 108.

In some embodiments, biometric data may also be collected to monitor the state of the mother in labor. Some non-limiting examples of such sensors may be a heart rate monitor, a blood pressure monitor, a thermometer, or the like to monitor the status of the user. The sensors may be integrated in a single device, such as a smart watch or fitness band, or may be separate devices the user may easily attach or detach to themselves for use. In some embodiments, the user may additionally utilize a heart rate monitor for the fetus to help ensure fetus health during transport to a care provider. The sensors may be configured to collect data periodically and transmit the data to user-computing device 108, which then interfaces with main server 102 and/or webserver 106. Upon receiving the biometric data, main server 102 and/or webserver 106 may determine the status of the user, such as an "in labor" or "emergency" status. Such processes may occur as background processes unnoticed by the user; in such embodiments, the user may receive a notification from the application notifying them of an automatic change in user status not submitted by the user.

By gathering data from both the application through input text fields or interactive graphical components and the user through sensors, the user-computing device 108 may generate a request that can be transmitted to main server 102 and/or the webserver 106. Specifically, the user may input a status change or transmit biometric data to the webserver 106, prompting the webserver 106 to instruct main server 102 to generate notifications in response to the user status.

For example, if the user has a cyclical increase in heart rate and blood pressure indicative of contractions, main server 102 may generate a notification that the user is in or is entering labor. In some instances, main server 102 or webserver 106 may request permission from the user to generate the notifications to the list of emergency contacts. This may be a customizable functionality that the user can adjust (e.g., by updating a setting on a page in the application from a settings menu). When the user updates the status directly instead of a status being determined from the biometric data, system 100 may assume user permission to notify emergency contacts is granted. In addition, when biometric data may indicate that the user is experiencing an emergency (e.g., heart rate spikes to maximum or drops to a minimum, blood pressure surpasses a safe maximum or recedes below a safe minimum, etc.), system 100 may issue a second round of notifications without permission from the user informing of the emergency state of the user. All notifications automatically determined from biometric data may also be pushed to user-computing device 108 in addition to client computing devices 110A through 110D to inform the user of their status if unknown.

Client computing devices 110A through 110D are computing devices including processing units. The processing units may execute the application as secondary users of the functionality tailored to the user. The processing units may include a processor with computer-readable medium, such as a random access memory coupled to the processor, which may be running algorithms or computer executable program instructions. The client computing devices 110A through 110D may interact with one or more software modules of a same or a different type operating within the system 100. Client computing devices 110A through 110D are associated with a family member, medical personnel, law enforcement personnel, and a member of the general public, respectively.

Examples of client computing devices 110A through 110B may be a smart phone, a tablet, a personal computer, and a webserver configured to interface with a hospital alert system or law enforcement alert system. For example, main server 102 and/or webserver 106 may generate a notification for communication to all client-computing devices 110A through 110D, but may utilize different routes of communication to transmit the notifications. For the family member, system 100 may retrieve stored contact information that may be used to send an SMS message, email, or automated telephone call to client computing device 110A. For medical personnel, system 100 may retrieve stored contact information, which may be used to contact either a particular person or a webserver that hosts a patient interface for a particular care provider or hospital associated with client computing device 110B. For law enforcement, system 100 may retrieve stored information that may be used to send an automated telephone call, an email, or connect to an alert system utilized by local law enforcement to process non-emergency service requests through a webserver (similar to that of the hospital or care provider system) to client computing device 110C. For the member of the general public, client computing device 110D may be a device connected to location services identified by system 100 as a device within the general vicinity of the travel route of the user identified by a GPS system.

The notifications may take multiple forms, which may be specific to the type of client computing device or the party associated with it. The following are non-limiting examples of different notification types. The embodiments herein are not limited to such. For example, the notifications may be communicated via any messaging platform compatible with system 100. In some embodiments, the family member may receive a more personal notification, such as a text message or a phone call. Medical personnel may receive a similar type of notification, or may receive an email or an alert through a patient portal. Law enforcement may receive the notification as a submission of an online form detailing the vehicle information and reason for submission or as an email with similar information. The member of the general public may receive the notification similar to other emergency alerts based on geographic locations, such as natural disaster warnings, Amber alerts, Silver alerts, or the like.

In addition to transmitting notifications to client-computing devices 110A through 110D in response to the user change in labor status, system 100 also activates sign 118. Sign 118 lights up in response to the user inputting that the user is en route to the care provider to user-computing device 108. Sign 118 may be implemented with at least one indicator signifying labor or delivery—in particular, the sign itself may include an illustration of a stork, which has associations with delivery in mythology, folklore and popular culture. In this way, the sign 118 may communicate to viewers that the vehicle on which it is placed is being used in connection with labor or delivery.

Such signage indicates to the general public that the vehicle is occupied with a user entering maternal labor, and thus indicates the state of emergency. The sign 118 may include at least one light emitting element. Examples of the light emitting element of sign 118 include a light emitting diode (LED), an incandescent light, a halogen lamp, or the like. In some embodiments, the sign may be acrylic or another durable material. Sign 118 may be wirelessly connected, such as via Bluetooth or WiFi, in order to communicate with host server 102 and user-computing device 108 via network 120. Sign 118 serves as a notification to those in the general vicinity of the vehicle of the status of the passengers. In some embodiments, sign 118 functions as a request for an escort from law enforcement to the hospital. For example, when local law enforcement receives the notification of the vehicle's presence on the roadways, the officers can keep watch for the sign and be able to escort the vehicle to the care provider included in the notification. Additionally, sign 118 can act as a request for right of way to other drivers.

The elements of system 100 all communicate via network 120. Network 120 may include, but is not limited to, private or public local area network, wireless local area network, metropolitan area network, wide-area network, and the Internet. Network 120 may further include both wired and wireless communications according to one or more standards via one or more transport mediums. The communication over network 120 is in accordance with various communication protocols such as transmission control protocol and internet protocol, user datagram protocol, and Institute of Electrical and Electronics Engineers communication protocols. Network 120 may further include wireless communications according to Bluetooth specification sets, or another standard or proprietary wireless communication protocol. Network 120 may further include communications over a cellular network, including, for example, a global system for mobile communications, code division multiple access, and enhanced data for global evolution network.

Figure 2:
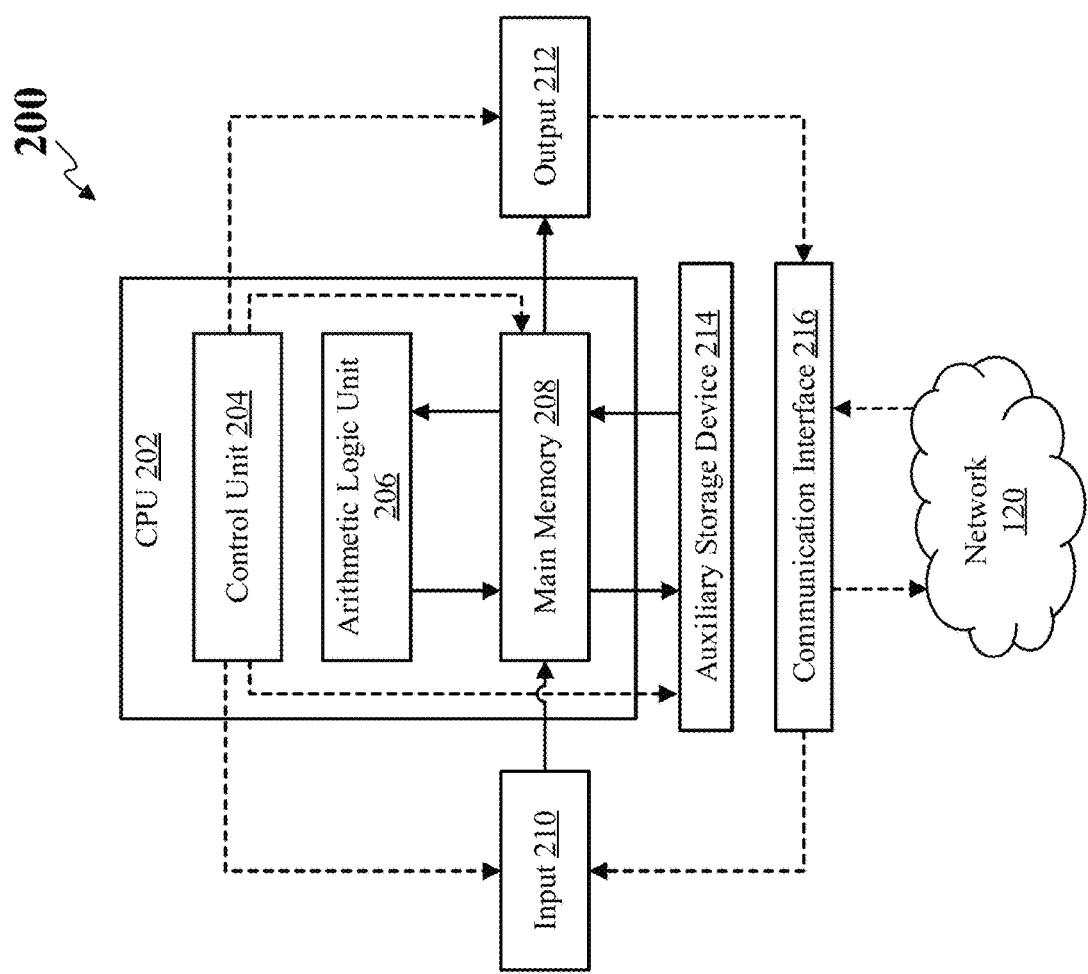
FIG. 2 is a block diagram illustrating a configuration of a host server according to the embodiment of FIG. 1.

Referring now to FIG. 2, is a block diagram illustrating a configuration of a server (e.g., main server 102 or webserver 106) according to the embodiment of FIG. 1. Non-limiting examples of server 200 may include a microprocessor, an application specific integrated circuit, and a field programmable object array, among others. Server 200 may include a CPU 202 including a control unit 204, an arithmetic and logic unit 206, and a main memory 208. Server 200 may further include an input device 210, an output device 212, an auxiliary storage device 214, and a communication interface 216 connected to network 120 of FIG. 1.

Control unit 204 may be a controller configured to control each of the arithmetic and logic unit 206, main memory 208, input device 210, output device 212, auxiliary storage device 214, and communication interface 216. Control unit 204 may receive inputs from a user-computing device, such as user-computing device 108 described with reference to FIG. 1 via input device 210 and fetch corresponding instructions from main memory 208 to determine tasks to be performed. In some embodiments, the instructions may require additional data stored in the auxiliary storage device 214, which may be loaded into main memory 208 prior to processing taking place in arithmetic logic unit 206. Control unit 204 may decode the instruction retrieved from main memory 208 and send control signals to arithmetic and logic unit 206, auxiliary storage 214, and output device 212 to perform necessary steps to execute the instructions.

Both input device 210 and output device 212 may utilize communication interface 216 to receive and transmit messages over network 120. In a non-limiting example, server 200 may receive an input indicating a change in status of the user, either due to a user interaction with the user-computing device or via sensors monitoring a user's condition. Such inputs may prompt the control unit 204 to retrieve instructions associated with the particular input from main memory 208. Server 200 may receive information via input device 210, and execute instructions to generate notifications to be sent via output device 212 to predetermined client computing devices (e.g., client computing devices 110A through 110D described with reference to FIG. 1). Output device 212 may be controlled by the CPU 202 to output the notifications generated by arithmetic logic unit 206 to the client-computing devices in response to the updated status of the user.

Upon receiving the input from the user-computing device, the arithmetic and logic unit 206 may store the input information in auxiliary storage 214. In some embodiments, auxiliary storage 214 operates similarly to local database 112 described with reference to FIG. 1. The input may include inputs such as user data, which may include, but is not limited to, medical history, familial medical history, pregnancy history, demographic information (including address and user contact information), preexisting condition information, allergies, medications, insurance information, a current pregnancy status, and historical biometric data of the user. This data may be stored in auxiliary storage device 214. When the status of the user is updated to be "in labor" or "en route to care provider," the input may include the status update and a current position of the user. When the status changes, arithmetic logic unit 208 may issue a command to be sent via output device 212 to the user-computing device to start monitoring the biometric data for signs of labor progress or an emergency status.

Arithmetic and logic unit 206 calculate, based on the current position and the position of the care provider, an ETA of the user at the facility and may determine whether the user is in a normal labor status or has an emergency status from the biometric data being monitored during transport of the user. For example, arithmetic and logic unit 206 may retrieve, from auxiliary storage device 214 the home and/or default starting coordinates of the user, and determine a travel route and calculate an ETA of the user based on the travel route. CPU 202 may communicate the coordinates to a GPS system which may communicate the ETA and travel route to server 200, at which point server 200 generates a notification for transmission to the client computing devices (e.g., computing devices operated by emergency contact list members). The notifications may be generated by CPU 202 and transmitted via communication interface 216 to the client computing devices.

Server 200 may be configured to generate at least two types of notifications. In some embodiments, the first type of notification occurs in response to a user status being updated to in labor or en route to the care provider. This may occur through user interaction with the mobile application to update the user status, or may be in response to biometric data indicating labor has started. This notification is generated by arithmetic logic unit 206 and includes the user status, the user vehicle information, the travel route and the ETA. The second type of notification occurs in response to a detection of an emergency status of the user based on biometric data. For example, if the fetal heart rate becomes faint, if the user experiences a significant spike or drop in heart rate or blood pressure indicative of complications (such as a change in the state of consciousness) or if contractions are spaced in time less than ten minutes apart or lasting for over 30 seconds. This is an indication that the user is far enough along in labor or that there are complications requiring emergency services to safely deliver the child.

Server 200 may transmit the notifications to the following groups of people: family members, care provider staff, law enforcement, EMS, and the general public who may traveling along the same travel route as the user or are traveling within a predetermined distance of the travel route. The family members and care provider staff may be contacted directly via the application or via a messaging service. Law enforcement and EMS may receive a general notification identifying the vehicle and the travel route the user is taking so as to notify officers along the way that the person in the vehicle is in need of medical attention. Members of the public may be identified by server 200 as recipients of the notifications if they are fellow users of the application, are using a map application that identifies the location of the member as along the travel route or within a predetermined distance of the travel route. Server 200 may issue a general notification similar to that of an Amber alert or Silver alert to be received on smart phones or other devices. Alternatively, server 200 may request a separate server to transmit notifications generated by server 200 to devices owned by members of the general public.

In addition to notifying the public through notifications, server 200 may also output a control signal to be transmitted to a sign affixed to the vehicle, such as sign 118 described with reference to FIG. 1, to use as a visual notification to the public. The sign may light up in response to the control signal and may remain lit until server 200 receives confirmation from the user-computing device that the mother has arrived at the care provider. The sign may serve as a universal indication of mothers en route to care providers, and may promote a similar reaction to an ambulance. In some embodiments, the sign may serve as a request for an escort from law enforcement vehicles it happens across or as a request to yield the right of way from other vehicles on the roadways, as well as indicate the reason for a particular speed or route of the vehicle.

Figure 3:
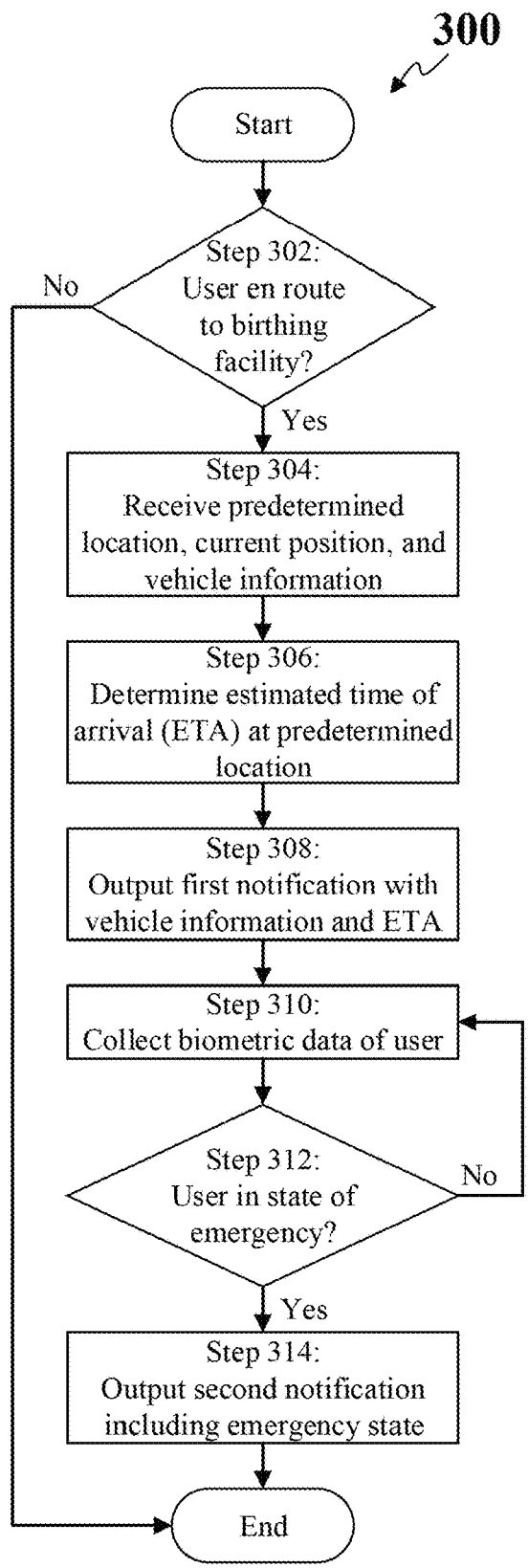
FIG. 3 is a flowchart illustrating an example of a method for alerting transport of a user in labor, according to an embodiment.

Referring now to FIG. 3, a flowchart illustrating an example of a method 300 for alerting transport of a user in labor, according to an embodiment is shown. Method 300 provides for monitoring of user during transport to a care provider, alerting a list of predetermined emergency contacts of the transport, include vehicle information and an estimated time of arrival at the care provider. Method 300 further provides for determining whether the user in in a state of emergency during transport, and alerting the list of predetermined emergency contacts of the emergency status. Method 300 may be executed by main server 102 and/or webserver 106 described with reference to FIG. 1.

Method 300 may begin with a step 302, in which the server may determine, based on an input from the client computing device, that the user is en route to the care provider. Step 302 may occur responsive to an input by the user updating a user status to reflect that they are en route to the care provider or that they are in labor. If the user is en route to the care provider (yes in step 302), method 300 may continue to a step 304. If the user is not en route (no in step 302), method 300 may terminate without performing any additional steps. In some embodiments, step 302 further includes activating a sign such as sign 118 described with reference to FIG. 1, such that the sign lights up to indicate to those who see it that a passenger is in transport to a care provider. In particular, in some embodiments, sign 118 may be provided with one or more "smart" bulbs that are controllable via Bluetooth or WiFi, such as the Philips Hue Bulb or Smart WiFi connected bulb made by Koninklijke Philips N.V. of Amsterdam, The Netherlands. Such "smart" bulbs may be activated via an application on a user's mobile phone, for example, so as to control color and/or brightness. In some embodiments, the sign 118 may be activated with a standard lightbulb connected via wiring to a vehicle's power supply and operated by a switch. In some embodiments, the sign 118 may be battery-operated. In some embodiments, the sign 118 may include a sound emitter (e.g., a speaker) coupled to the sign 118 that may draw power from the vehicle and/or via a battery. In some embodiments, the speaker may be Bluetooth or WiFi enabled and may be operable via the user-computing device 108 (e.g., by an application on the device).

In step 304, the server may receive an input at the client-computing device including a predetermined location, the current position of the user, and the vehicle information. The predetermined location may be a clinic or care provider, and may be identified by an address or geographical coordinates. The current position of the user may be an address, such as a home address or default address, or geographical coordinates. In some embodiments, the current position of the user may be automatically determined by a global positioning system (GPS) configured to triangulate the position of the user-computing device. In some embodiments, in addition to or instead of GPS, one or more of the following may be used to determine and/or communicate the user position: geofencing, wireless communication, Bluetooth communication, or any combination thereof. The vehicle information may include a make, model, color, tag registration, license information, and insurance information, or other information necessary to identify the vehicle.

Method 300 may continue with a step 306, in which the server determines an estimated time of arrival (ETA) of the user at the predetermined location using the current position of the user. The server may be in communication with the GPS system to determine the ETA, or this step may be performed by a separate GPS system configured to communicate with the server via the user-computing device to determine the ETA. In some embodiments, in addition to or instead of GPS, one or more of the following may be used to determine and/or communicate ETA: geofencing, wireless communication, Bluetooth communication, or any combination thereof. Determining the ETA may be achieved by utilizing a GPS to determine a travel route along which the user is traveling to the care provider, and base the ETA upon the travel route. The ETA may be adjusted to reflect traffic present along the travel route.

Method 300 may continue with a step 308, in which the server outputs a first notification including the vehicle information and the ETA to a set of one or more second electronic devices that may be associated with members of an emergency contact list stored in a database accessible to the server. In some instances, the first notification may also include the travel route of the user. The one or more second electronic devices may be communicatively coupled to the first electronic device (e.g., the user-computing device) and the server. The emergency contacts may be determined in advance by the user through the user-computing device, or may be specified at the time of user status update. The emergency contacts may include family members, medical personnel, law enforcement personnel, and travelers (e.g., members of the general public and EMS) having a travel trajectory overlapping the travel route of the user.

In some embodiments, step 308 may include identifying those electronic devices associated with travelers having a travel trajectory overlapping the route using a GPS to which the one or more electronic devices are connected. The GPS may be a system which the server is communicatively coupled such that information can be exchanged between both systems. The GPS and the server may determine that travelers having at least a portion of their route overlapping the user travel route or travelers using a GPS map application within a predetermined distance, such as one mile from the travel route, may receive the first notification.

Method 300 continues with a step 310, in which the server continuously collects, via the first electronic device, biometric data of the user. The biometric data may be obtained from sensors, such as a heart rate monitor, blood pressure monitor or the like to monitor the user's vitals. These sensors may be incorporated into a wearable device such as a smart watch or fitness band, which may connect wirelessly to the user-computing device. The user-computing device may transmit any collected biometric data to the server for processing, where it may be used to establish a baseline for the user to be stored in a database as a running average such that when data comes in having a large deviation from the average, the server may determine a complication or emergency status of the user in method 300.

Method 300 may continue with a step 312, in which the server determines, based on the collected biometric data, whether the user is in an emergency state. A change in consciousness or progression of labor may transition the user state to an emergency state. For example, if the sensors record a significant drop in heart rate or blood pressure, the server may determine that the user has a risk of losing consciousness, and may automatically update the user status to reflect the emergency status. In another example, if the sensors record an increase in heart rate for greater than 30 seconds spaced at less than 10 minutes apart, the server may determine that the user is in an advance stage of labor, and will need medical attention immediately upon arriving to the care provider. If the server determines that the user is in a state of emergency (yes in step 312), the method will proceed to a step 314. If the server determines that the user is not in a state of emergency (no in step 312), method 300 will return to step 310 to continue to collect biometric data to monitor the user status.

Method 300 may never determine that the user enters a state of emergency at step 312. Accordingly, the server may implement a timer interrupt configured to end method 300 prematurely (e.g., force method 300 to end) after a predetermined monitoring time has elapsed or the user is determined to have arrived at the care provider. For example, the server may continue to monitor a user status by collecting biometric data at step 310 and checking for anomalies that may indicate an emergency at step 312 until a current position of the user (e.g., GPS coordinates of the user) matches that of the care provider or the user confirms their arrival at the care provider. In some embodiments, method 300 may have an interrupt function accessible to the user to end method 300 at any time.

After determining the user is in a state of emergency in step 312, method 300 may continue to a step 314. During step 314, the server outputs a second notification including the emergency status of the user to the one or more second electronic devices. This may occur automatically in response to detecting the emergency state. In some embodiments, the server may transmit the second notification only to devices associated with family, medical personnel, or EMS. For example, while law enforcement and travelers may receive the first notification, the emergency status of the user may only be communicated to those pre-designated by the user. The second notification may also include the data that triggered the notification to be generated and sent, and the possible emergency concern. This provides additional information to medical personnel such that they may prepare for the user's arrival at the care provider and be prepared to handle any complications that may arise from the user status.

Method 300 may terminate with step 314. In an alternative embodiment, after transmitting the second notification, method 300 may return to step 310 to continue monitoring the user status to provide any additional biometric data to medical personnel that may be beneficial to treating the user upon arrival at the care provider. The server may switch over to automatically transmitting the biometric data to medical personnel, which may be viewed and monitored on a display device in communication with the server, such as through the mobile application, by an obstetrician/gynecologist (OB/GYN) overseeing the labor.

Although the embodiment of method 300 described herein is performed by a server, method 300 is not limited to such. For example, in a non-limiting alternative embodiment, method 300 may be executed by a user-computing device with GPS connectivity configured to notify emergency contacts through text messages, emails, or phone calls. The user-computing device may share notifications with the individuals traveling along the predetermined route by utilizing a reporting feature of different map applications to notify travelers along the same route of the presence of an unmarked emergency vehicle.

In method 300, the server may be configured to generate separate notifications for each type of end user. For example, the notifications received by family members and medical personnel may include information such as a user's name and labor progress. The family members may further receive a link to monitor and/or watch the birth remotely. Law enforcement and travelers may receive only vehicle information and an indication that the vehicle is en route to a hospital, but may exclude information such as the user name, status, hospital or clinic location, or any personal identifiable information (PII).

Figure 4:
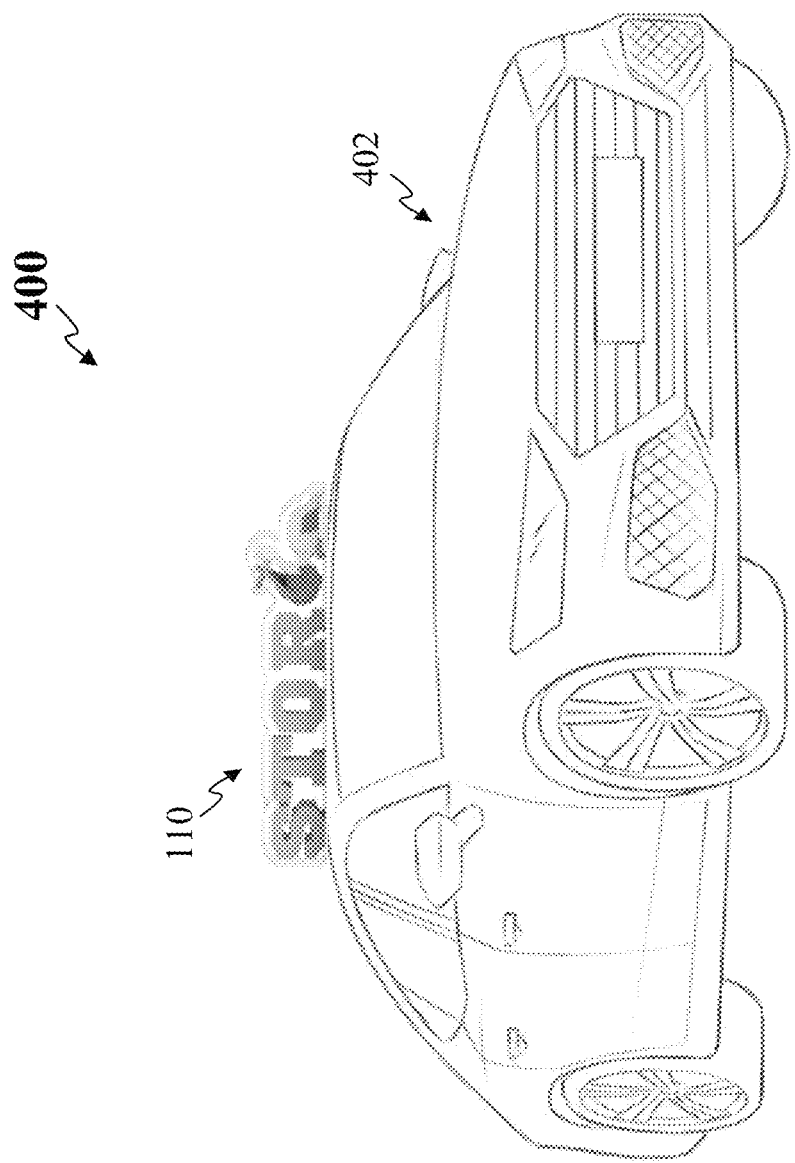
FIG. 4 is an illustrative example of a transport apparatus for users of the system of FIG. 1, according to an embodiment.

Referring now to FIG. 4, an illustrative example of a transport apparatus 400 for users of the system of FIG. 1, according to an embodiment, is shown. Transport apparatus 400 may include a vehicle 402 and a sign 118 indicating the vehicle as a transport apparatus 400 for transporting a woman in labor. The vehicle 402 may be a vehicle for picking up, transporting, and dropping off a user at a care provider. Such an embodiment of transport apparatus 400 may be utilized when a user cannot transport themselves or have a family member transport them to the care provider. Transport apparatus 400 may be contacted and reserved through the application described with reference to FIGS. 1 through 3. The application may be accessed by a user-computing device such as that described with reference to FIG. 1. The application may have a page to request server from transport apparatus 400. In some embodiments, sign 118 is easily placed on a user-owned vehicle acting as vehicle 402.

Vehicle 402 may be a generic unmarked non-emergency vehicle, either owned by the user or a designated driver. The registration for vehicle 402 may be registered permanently with law enforcement as a vehicle for transporting mothers in labor. Sign 404 may be affixed to vehicle 402 using straps, adhesive, or a fastening device easily attachable and detachable from vehicle 402. Sign 118 may be an acrylic sign with light emitting diode (LED) lights disposed inside to light up sign 118. Sign 118 may connected to the application, and may be configured to identify a user matched with the vehicle (e.g., in the instance of requesting a ride) through heart beat recognition determined through the biometric data collected by a user-computing device and server such as that described with reference to FIG. 1. In a non-limiting embodiment in which vehicle 402 is assigned to users of the application upon request, information about a fleet of vehicles 402 may be auto-populated in a database accessible to first respondents such as law enforcement and emergency medical services (EMS) to easily identify vehicles transporting users in labor to care providers (e.g., birthing facilities).

Figure 5C:
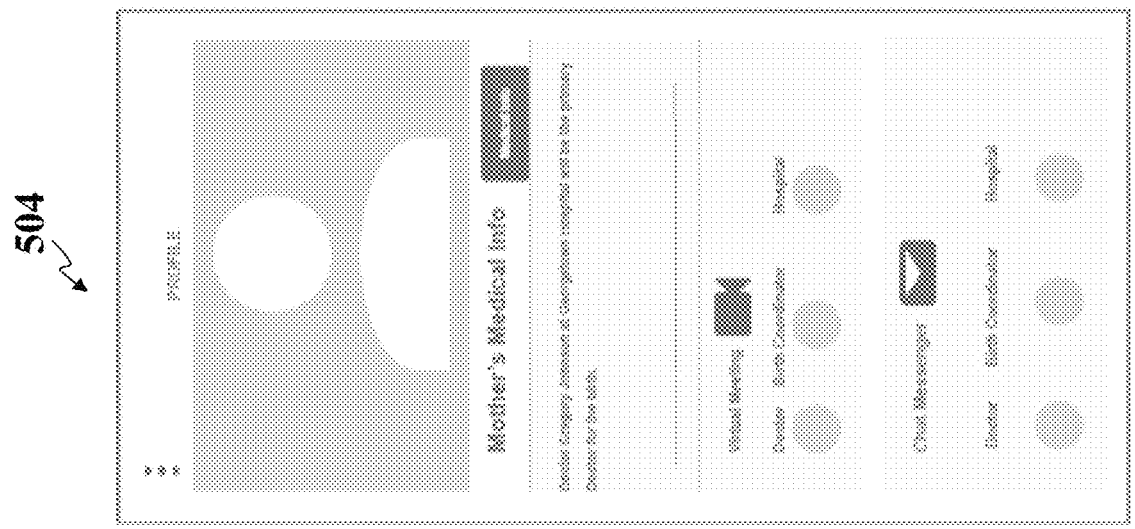
FIGS. 5A-5O are illustrative examples of a mobile application for accessing the system of FIG. 1, according to an embodiment.
Figure 5B:
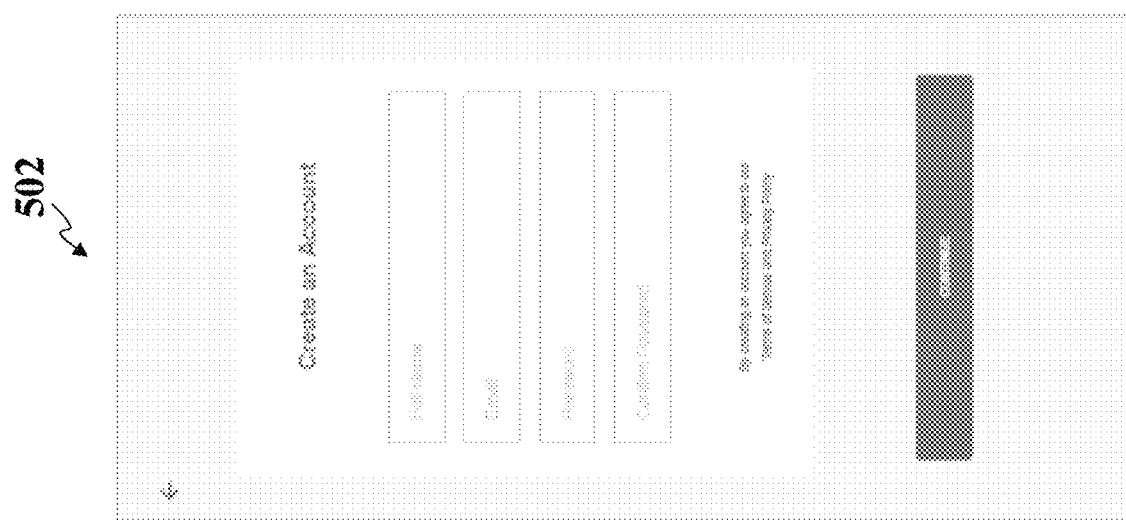
Figure 5A:
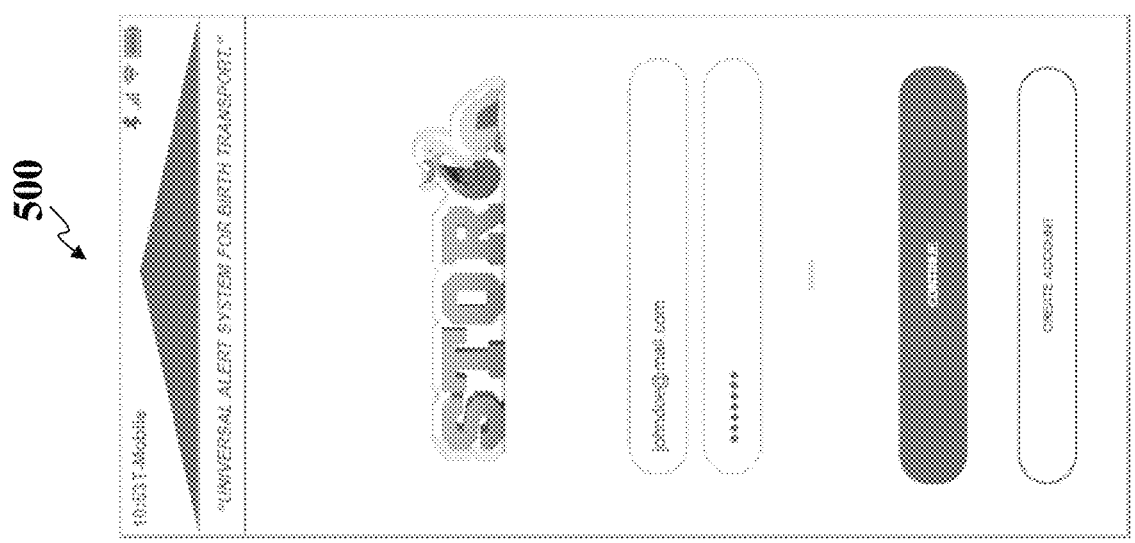
Figure 5I:
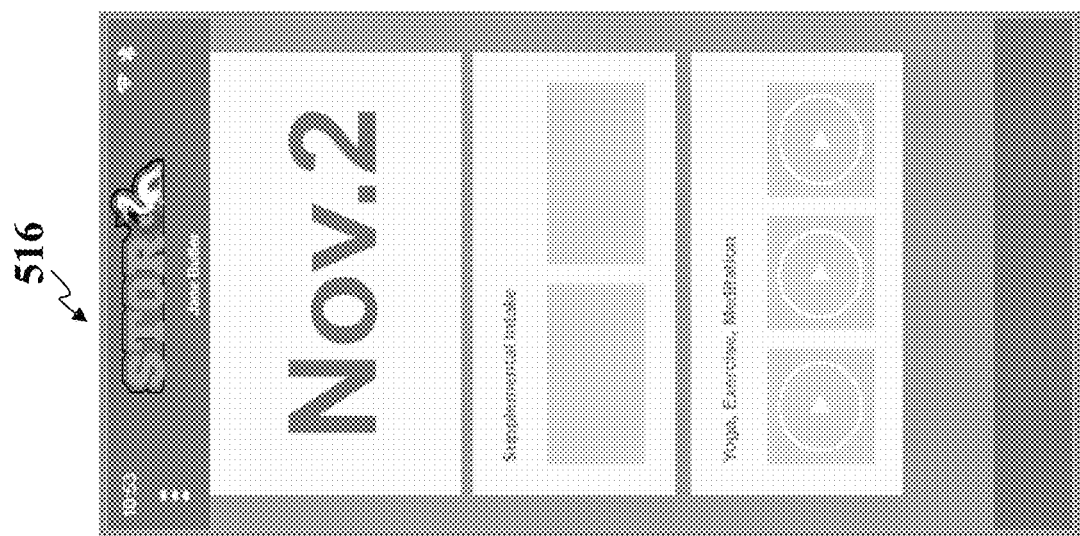
Figure 5H:
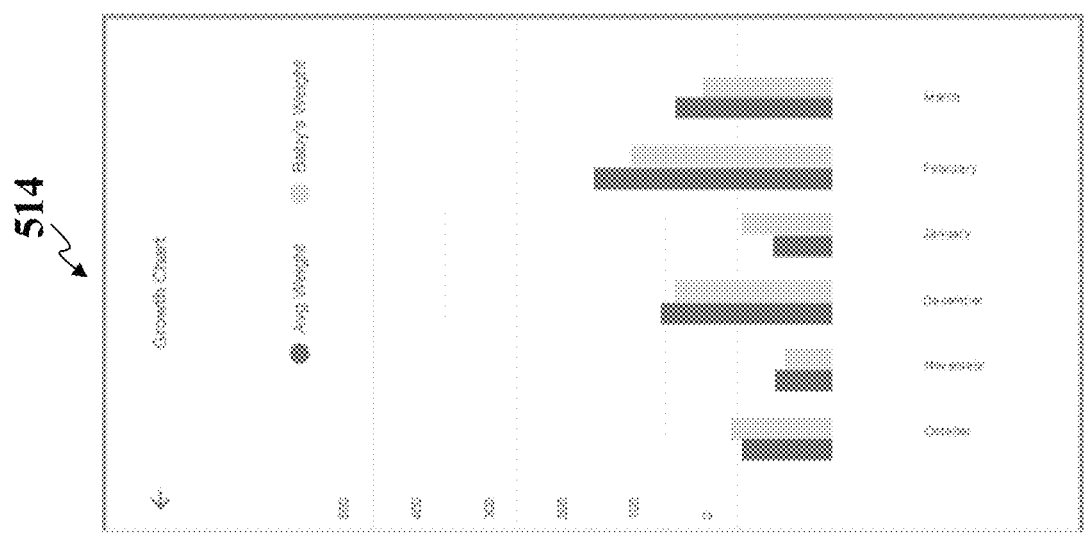
Figure 5G:
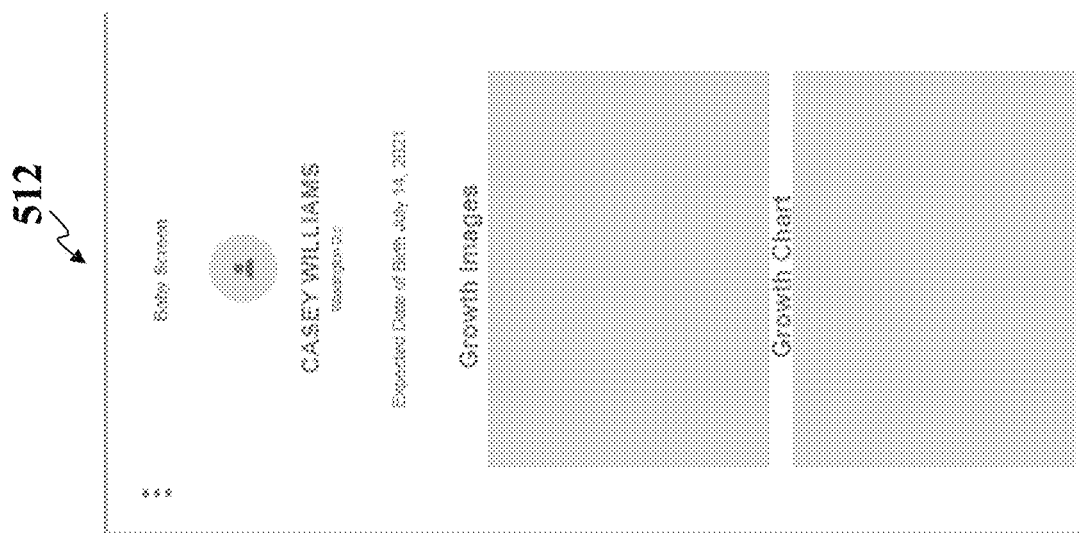
Figure 5L:
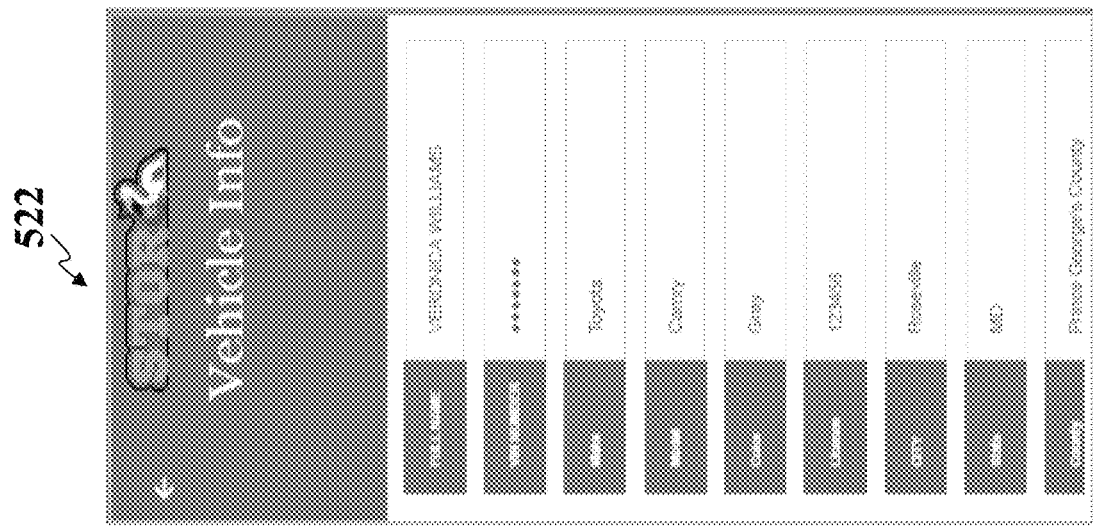
Figure 5K:
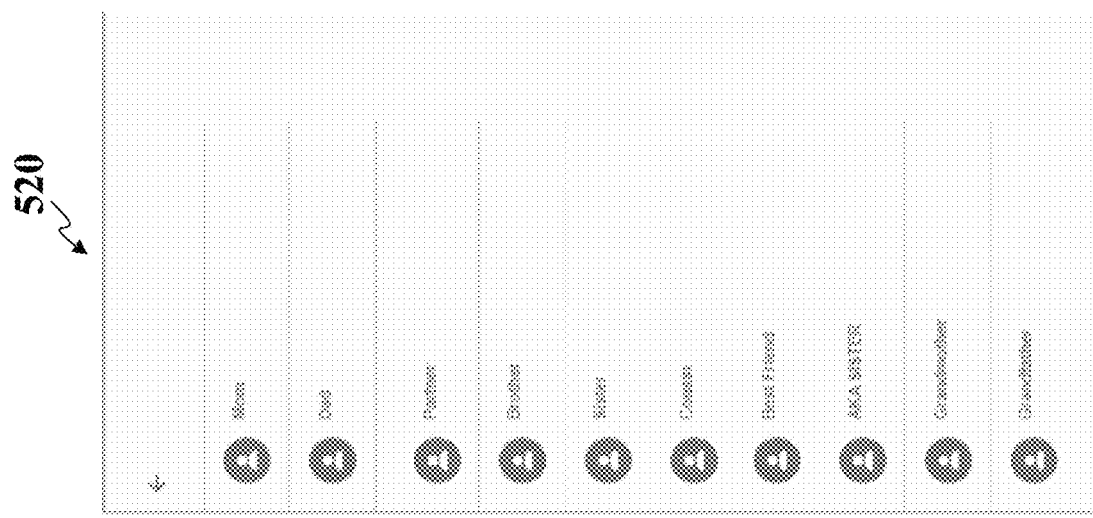
Figure 5J:
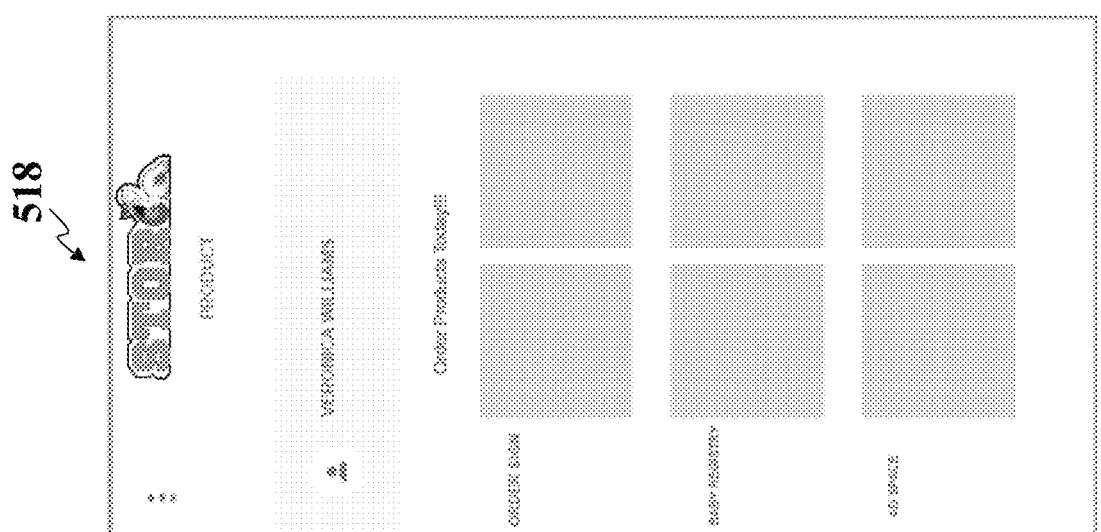
Figure 5O:
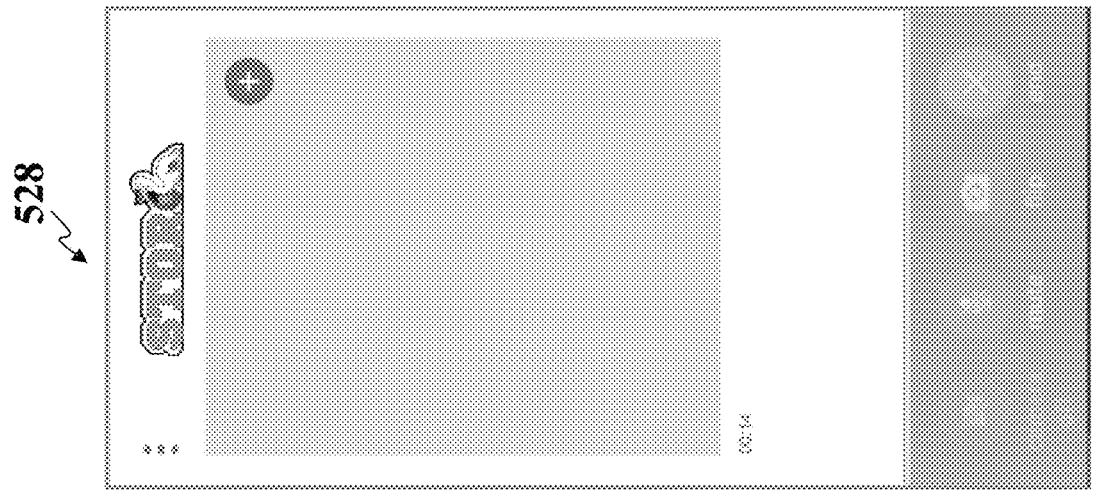

Referring generally to FIGS. 5A through 5O, a series of non-limiting illustrations of a mobile application through which a user accesses the system of FIG. 1 is shown according to at least one embodiment. The mobile application may be accessed via a user-computing device, such as user-computing device 108 described with reference to FIG. 1. The mobile application begins with a start page 500, as depicted in FIG. 5A. Start page 500 includes text fields for receiving login information such as a username and password. In some embodiments, start page 500 may automatically perform facial recognition or request input of a voice or a fingerprint in order to biometrically authenticate the user. Start page 500 also provides an option to create an account as an alternative to signing in to an existing account. FIG. 5B illustrates an example of an account creation page 502, in which a user can create an account using their name and email and creating a password. In some embodiments, account creation page 502 may offer a user the option to link their password to a biometric, such as a fingerprint, a face, or a voice.

After creating an account, the user is taken to a profile page 504, illustrated in FIG. 5C. Profile page 504 includes a profile picture of the user, medical information (e.g., medical history including preexisting conditions, recent visits, biometrics such as age, weight and height, etc.), contact information for a care provider facility (e.g., a hospital), a doctor (e.g., an obstetrician/gynecologist), and a birth coordinator. Profile page 504 can further include buttons to initiate a virtual meeting or an electronic chat with the listed contacts. When initiating an electronic chat session, mobile application transitions to a chat page 506, such as that illustrated in FIG. 5D. Chat page 506 displays a message exchange between the user and the contact involved in the electronic chat session. The mobile application provides its own secure electronic chat session through the use of host server 102 or webserver 106 described with reference to FIG. 1. In some embodiments, the mobile application provides an option to the user to use a third party chat application.

When creating an account, the user may be given the option to invite a partner of the user to be an additional user of the mobile application. In such an embodiment, the partner will be sent an invitation to download the mobile application and fill out a profile, and the mobile application will appear differently based on whether the user is the mother or the partner. For example, the mother will view a mother page 508 such as that illustrated in FIG. 5E. Mother and biometric data (e.g., height, weight, or the like). Mother page 508 may also display information regarding the pregnancy, such as the baby due date, state of the mother's body, incidences of baby kicks and contractions, and diet logs. Mother page 508 may also display a banner including articles generated by a server such as host server 102 described with reference to FIG. 1. The articles may be displayed in the form of an image and hyperlink, and are related to the state of pregnancy of the mother. The partner will view a partner page 510, such as that illustrated in FIG. 5F. Partner page 510 may include information such as a name, profile picture and biometric data of the partner (e.g., height, weight, or the like). Partner page 510 includes logs for logging mental health status and diet to keep track of the partner's health throughout the pregnancy as well. Partner page 510 can display an article in a manner similar to that of mother page 508, and may display the same article as the mother or a different article tailored to the partner's experience.

In addition to mother page 508 and partner page 510, the mobile application includes a baby page 512 such as that illustrated in FIG. 5G. Baby page 512 includes the baby's name (if chosen), a profile picture, growth images (e.g., sonograms, comparative sizing pictures, etc.) and a growth chart depicting the baby's growth over time. In some embodiments, the growth chart may be expanded to a growth chart page 514 as illustrated in FIG. 5H. Baby page 512 can be updated by the mother, the partner, or automatically by a server such as host server 102 or webserver 106 described with reference to FIG. 1 in response to receiving updated information from a care provider such as through a healthcare portal. For example, the mobile application can be linked to a healthcare portal account and exchange information through host server 102 or webserver 106 to periodically update the information used to fill the growth images or growth chart. Growth chart page 514 includes the baby's weight compared to the average weight over time. In some embodiments, growth chart page 514 may provide additional information about whether or not the baby's growth over time is within a particular percentile of growth or size.

In some embodiments, the mobile application may further include a calendar page 516 for tracking when particular supplements or medication needs to be taken by the mother as illustrated in FIG. 5I. In addition, calendar page 516 may display information about doctor's appointments, Lamaze classes, medications (e.g., supplements, vitamins, etc.), and exercise and meditation or the like in order to keep track of any necessary changes to the mother's schedule. Calendar page 516 also reminds the mother or the partner users of upcoming appointments or the need to schedule upcoming appointments by providing reminders and notifications. These reminders allow the users to keep track of all appointments, medications, classes and other schedule changes that occur to a mother's schedule during pregnancy in one convenient location, easing the burden of scheduling on the parents-to-be. In some embodiments, the mobile application may provide on calendar page 516 an interface through which a user is able to request an appointment or sign up for Lamaze classes.

In some embodiments, the mobile application includes a product page 518 configured to display baby products or provide access to a registry, as illustrated in FIG. 5J. Product page 518 provides a space for products to be advertised to the user based on pregnancy stage or the baby registry. The mobile application may track interactions of the user with these features to maintain a purchase history and product viewing history of the user, which may be used to provide targeted advertisements for products the user is more likely to desire or purchase.

In some embodiments, the mobile application may include a contacts page 520 such as that illustrated in FIG. 5K for the user to designate which a set of emergency contacts that would receive the notifications generated by the mobile application in the event a user goes into labor. The set of emergency contacts may include family members input by the user into contacts page 520. In some embodiments, there may be subsets of contacts configured to receive only one of the notifications or all of the notifications. For example, a user may designate a group of contacts including immediate family to receive the first notification indicating the user is en route to the care provider and the second notification indicative of the user experiencing a state of emergency. A second group of contacts including extended family and friends may only receive the first notification to prevent sensitive information about the user status that the user would prefer to be kept private. Such information may be filled out in advance of the user entering labor such that the user need not designate notification recipients while en route to the care provider.

The mobile application further provides a vehicle information page 5220 such as that shown in FIG. 5L. Vehicle information page 522 includes a series of text input fields for entering the user vehicle information in advance of labor, such as make, model, color, vehicle identification number (VIN), license plate number and license plate registration information. The information collected by vehicle information page 522 is stored in a database, such as database 102 described with reference to FIG. 1, and is retrieved at the time of labor to be included in the notifications to law enforcement and emergency services. By providing the vehicle information, law enforcement and emergency medical technician personnel can be on the lookout for the vehicle, and provide assistance (such as serving as an escort), on the way to the care provider. The information collected by vehicle information page 522 may be communicated to law enforcement in advance or may be included only when the first set of notifications are transmitted to the set of emergency contacts designated by the user.

Figure 5N:
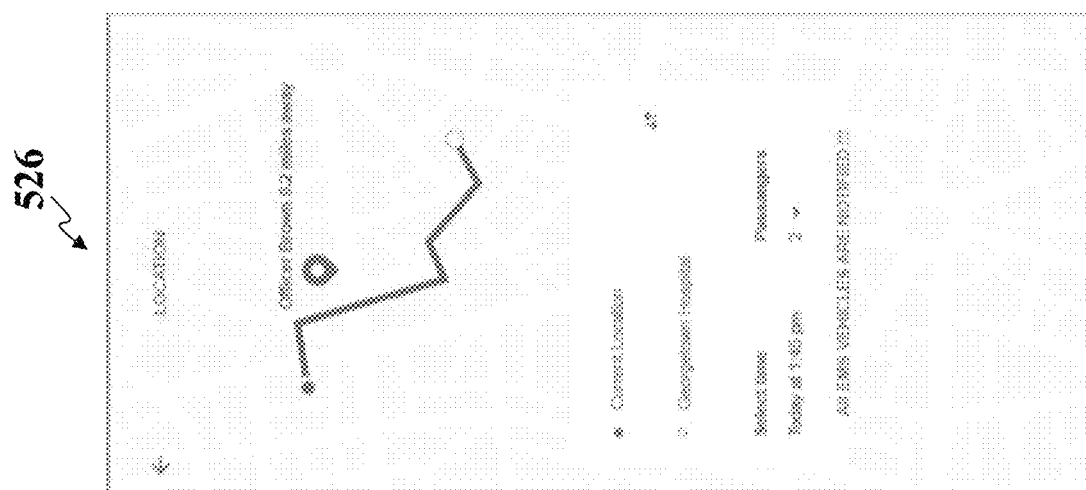
Figure 5M:
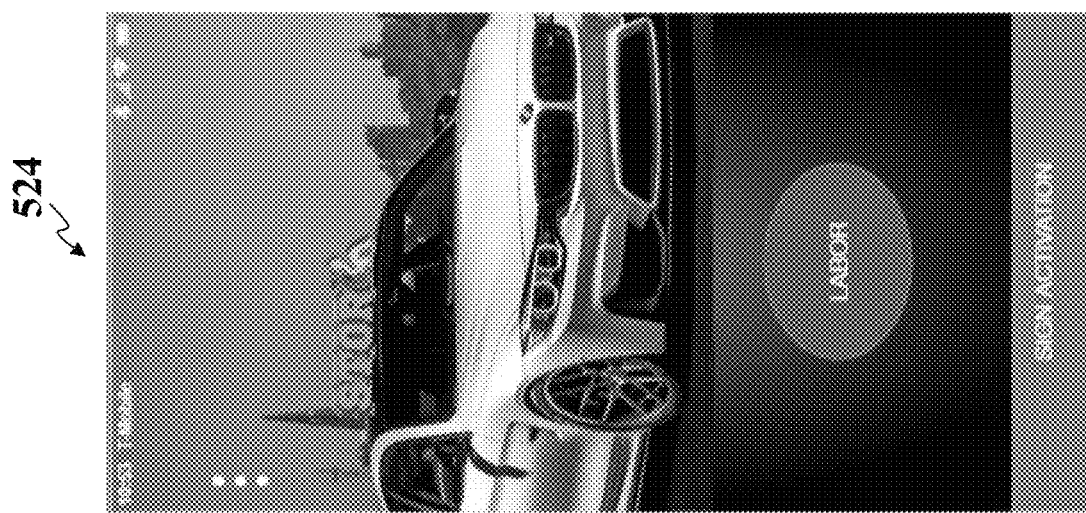
Figure 6A:
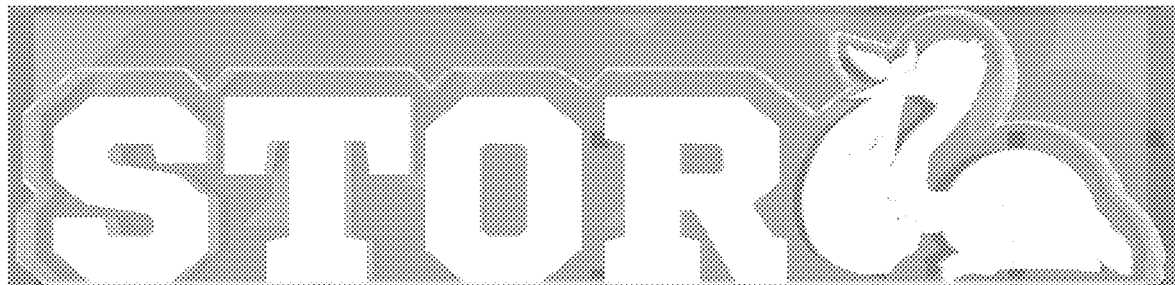
FIG. 6A is a front view of a sign according to an embodiment.
Figure 6B:
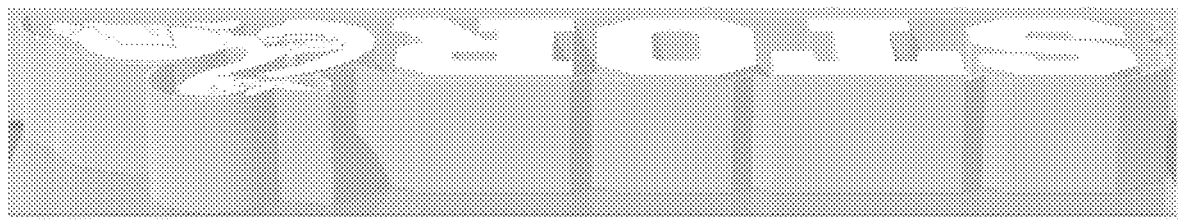
FIG. 6B is a top perspective view of a sign according to the embodiment of FIG. 6A.
Figure 6C:
FIG. 6C is a first side perspective view of a sign according to the embodiment of FIG. 6A.
Figure 6D:
FIG. 6D is a second side perspective view of a sign according to the embodiment of FIG. 6A.
Figure 6E:
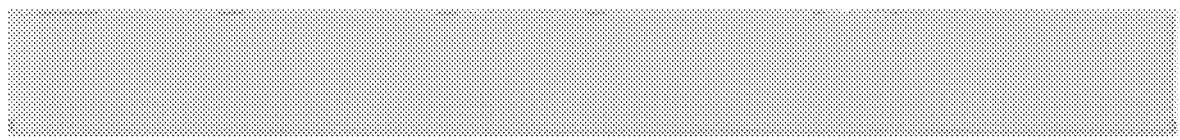
FIG. 6E is a bottom view according to the embodiment of FIG. 6A.
Figure 6F:
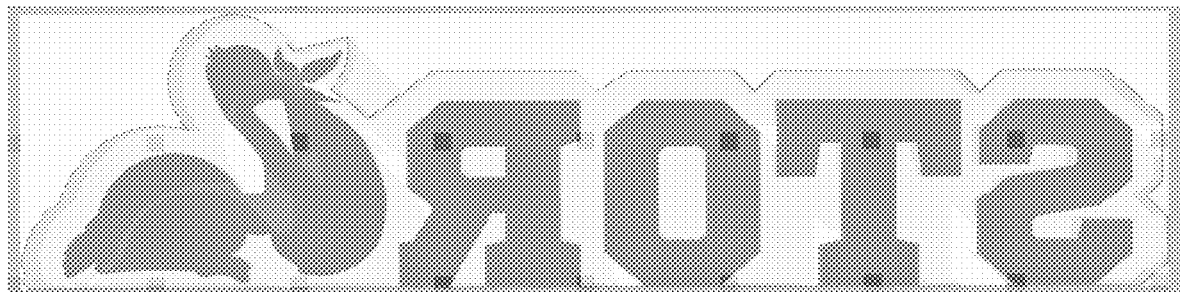
FIG. 6F is a rear view of a sign according to the embodiment of FIG. 6A.
Figure 6G:
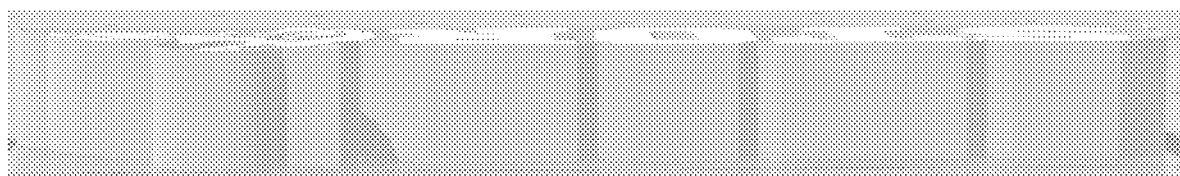
FIG. 6G is a top view of a sign according to the embodiment of FIG. 6A.
Figure 6H:
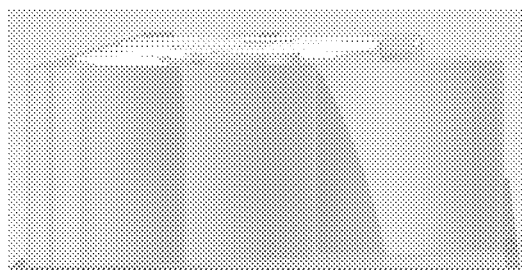
FIG. 6H is a right side view of a sign according to the embodiment of FIG. 6A.
Figure 6I:
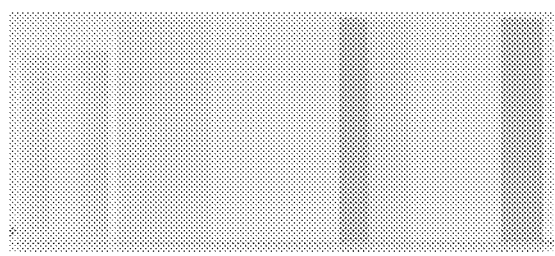
FIG. 6I is a left side view of a sign according to the embodiment of FIG. 6A.
Figure 6J:
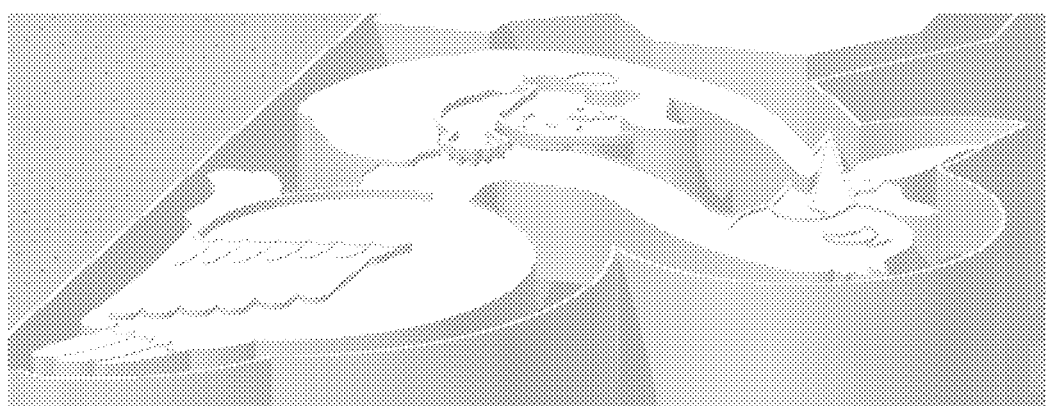
FIG. 6J is a detail view of a sign according to the embodiment of FIG. 6A.
Figure 7A:
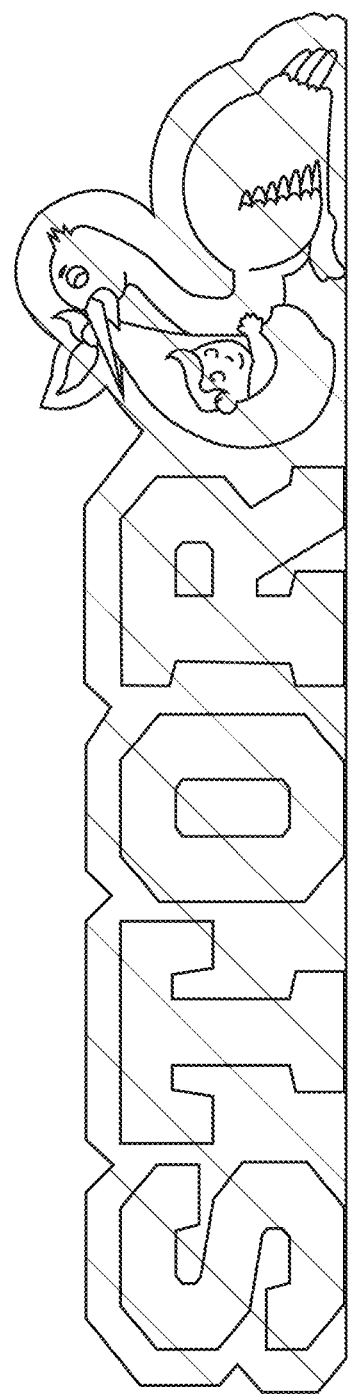
FIG. 7A is a front view of a sign according to an embodiment.
Figure 7B:
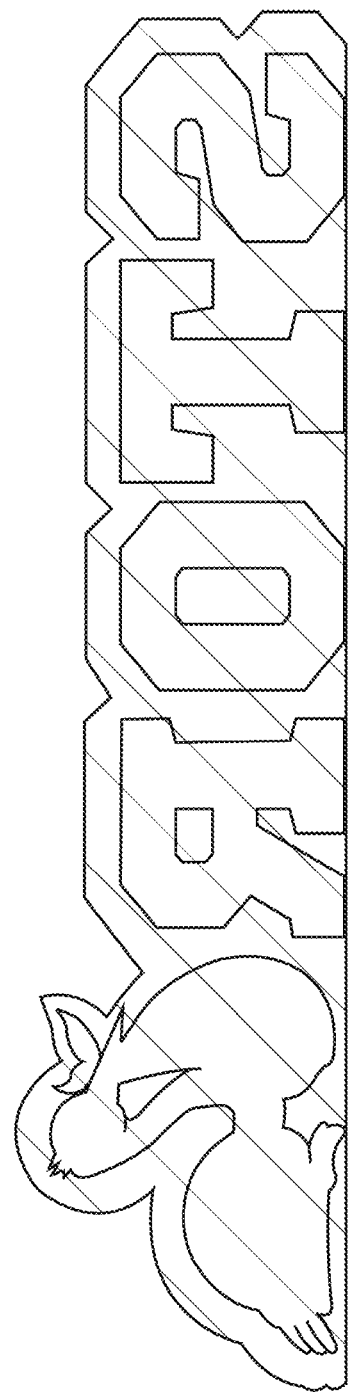
FIG. 7B is a rear view of a sign according to the embodiment of FIG. 7A.
Figure 7C:
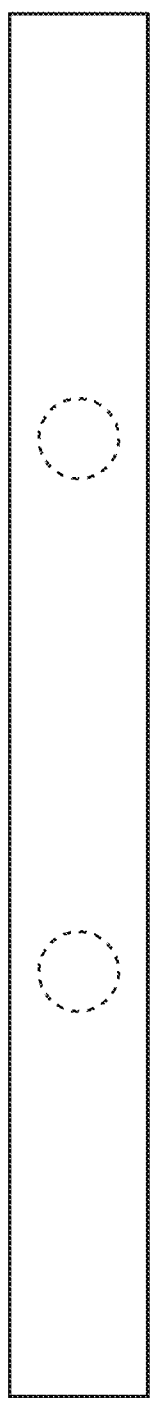
FIG. 7C is a left side view of a sign according to the embodiment of FIG. 7A.
Figure 7D:
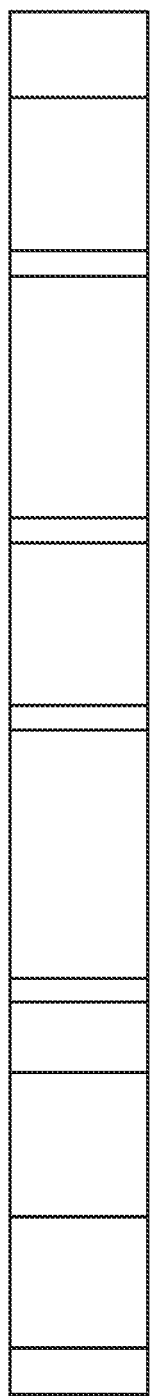
FIG. 7D is a left side view of a sign according to the embodiment of FIG. 7A.
Figure 7E:
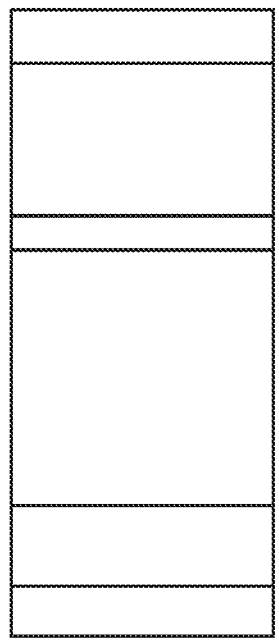
FIG. 7E is a top view of a sign according to the embodiment of FIG. 7A.
Figure 7F:
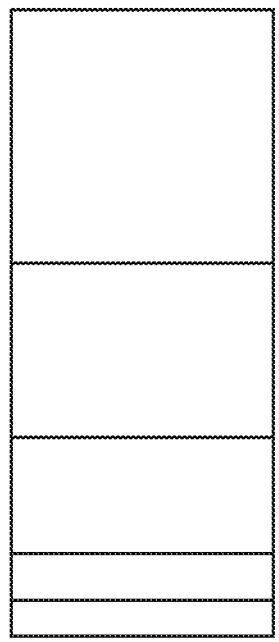
FIG. 7F is a bottom view of a sign according to the embodiment of FIG. 7A.
Figure 7G:
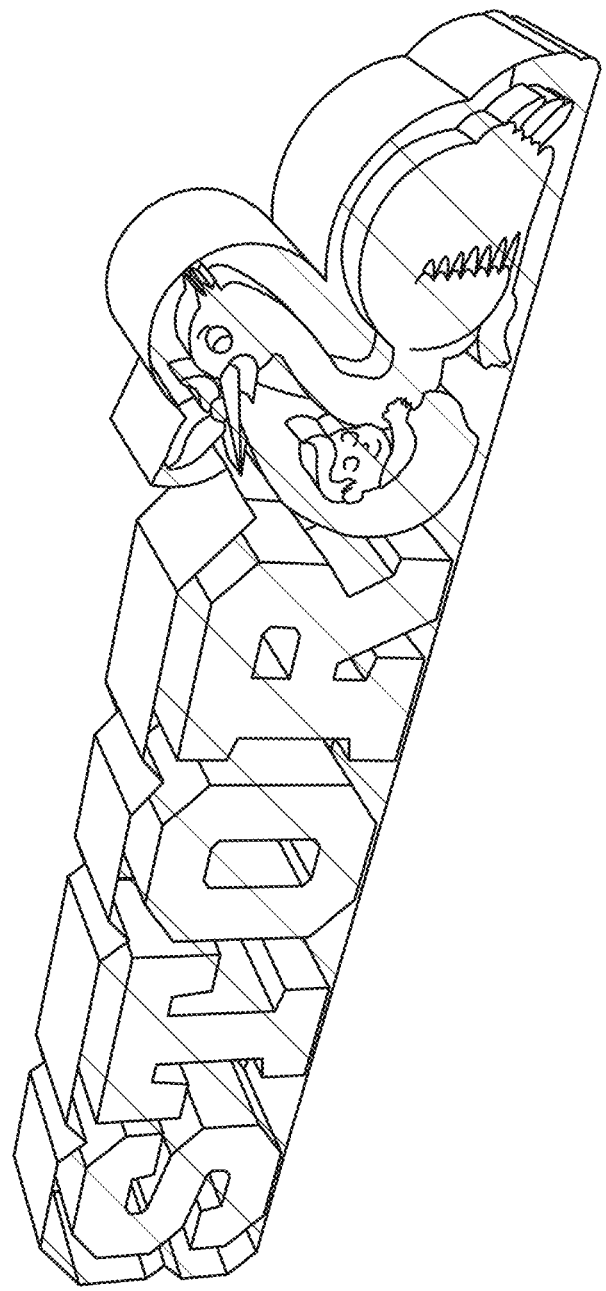
FIG. 7G is a perspective view of a sign according to the embodiment of FIG. 7A.

To minimize the amount of interaction with the mobile application during maternal labor of the user, the mobile application may provide a labor status page 524 as seen in FIG. 5M, which includes a button with which the user can interact to designate the labor status as in-progress. When the user interacts with labor status page 524, a server hosting the mobile application will generate the notifications to be sent to the list of contacts designated by the user. Labor status page 524 may also include a button for activating a sign, such as sign 118 described with reference to FIGS. 1 and 4. Once the user activates the sign and changes the labor status to active, the mobile application may display a map page 526 such as that shown in FIG. 5N. Map page 526 displays the route and travel progress of the user. The mobile application may use a global position system (GPS) to locate a current position of the user relative to a predetermined location (e.g., the care provider) and determine an estimated time of arrival of the user at the predetermined location, all of which is displayed on map page 526. In the event of an induction, the user may set a time at which to arrive at the care provider, and the mobile application may remind the user at a time approximately equal to the travel time prior to the appointment time. In some embodiments, map page 526 may include locations of nearby law enforcement or emergency services vehicles on the roadway such that the user is aware of their presence and vice versa.

In some embodiments, the mobile application may provide a livestream page 528 such as that illustrated in FIG. 5O. Livestream page 528 may provide the ability for those listed on contacts page 520 to view the birth over a livestream feed if unable to physically attend the birth. Livestream page 528 may be controlled by the partner in order to begin and end the livestream of the birth, and include features such as an on/off button, a flip camera button, a mute button, a start button, an end button, a new recording button or the like. These features are configured to control a camera and microphone of a smart phone or tablet to control the livestream. Livestream page 528 may also double as a recording page for the new parents to generate a recording of the birth to send to the emergency contacts, which may arrive via a form of electronic communication such as a text message, email attachment, or the like. Livestream page 528 may provide to the set of emergency contacts set on contacts page 520 a link to view the livestream. The link may open a webpage in an accessible browser where the livestream can be displayed.

FIGS. 6A-6J depict a sign according to at least one embodiment. The sign is mountable to a surface, e.g., the surface of a vehicle, according to at least one embodiment. FIGS. 6A-6J depict various views of the exemplary sign.

FIGS. 7A-7G depict a sign according to at least one embodiment. The sign is mountable to a surface, e.g., the surface of a vehicle, according to at least one embodiment. FIGS. 7A-7G depict various views of the exemplary sign.

Various aspects and embodiments disclosed herein are described for purposes of illustration rather than of limitation. It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A system for facilitating communication in regard to a user in maternal labor, the system comprising:
    a first electronic device;
    at least one second electronic device; and
    a server including a processor configured to:
        responsive to receiving a change in labor status from the first electronic device, retrieve coordinates of a predetermined location, a current position of the user, and vehicle information corresponding to a vehicle in which the user is traveling to the predetermined location;
        transmit a command to activate an electronic sign, the electronic sign configured to indicate the labor status;
        determine an estimated time of arrival of the user at the predetermined location using the current position of the user;
        transmit a first notification including at least one of the vehicle information or the estimated time of arrival to the at least one second electronic device;
        transmit an electronic message to the at least one second electronic device;
        collect biometric data of the user using one or more sensors;
        determine whether the user is in an emergency state based on the collected biometric data; and
        when the user is determined to be in the emergency state, output a second notification including information related to the emergency state to the at least one second electronic device.

2. The system of claim 1, wherein the processor is further configured to determine a route along which the user is traveling to the predetermined location, and the first notification further includes the determined route.

3. The system of claim 2, wherein the at least one second electronic device comprises at least one of:
    an electronic device associated with a personal acquaintance of the user;
    an electronic device associated with medical personnel;
    an electronic device associated with law enforcement; and
    one or more electronic devices associated with travelers having a travel trajectory overlapping the route.

4. The system of claim 1, wherein the emergency state is determined based on a state of consciousness or progression of labor.

5. The system of claim 1, wherein the electronic message is transmitted from the first electronic device to the at least one second electronic device by short message service (SMS).

6. A non-transitory computer readable medium configured to store instructions which, when executed by one or more processors, cause the one or more processors to:
    responsive to receiving a change in maternal labor status from a first electronic device, retrieve coordinates of a predetermined location, a current position of a user, and vehicle information corresponding to a vehicle in which the user is traveling to the predetermined location;
    transmit a command to activate an electronic sign, the electronic sign configured to indicate the labor status;
    determine an estimated time of arrival of the user at the predetermined location using the current position of the user;
    transmit a first notification including at least one of the vehicle information or the estimated time of arrival to at least one second electronic device;
    transmit an electronic message to the at least one second electronic device;
    collect biometric data of the user using one or more sensors coupled to the processor;
    determine whether the user is in an emergency state based on the collected biometric data; and when the user is determined to be in the emergency state, output a second notification including information related to the emergency state to the at least one second electronic device.

7. The non-transitory computer readable medium of claim 6, wherein the instructions further cause the one or more processors to determine a route along which the user is traveling to the predetermined location, wherein the first notification further includes the determined route.

8. The non-transitory computer readable medium of claim 7, wherein the at least one second electronic device comprises at least one of:
- an electronic device associated with a personal acquaintance of the user;
- an electronic device associated with medical personnel;
- an electronic device associated with law enforcement; and
- one or more electronic devices associated with travelers having a travel trajectory overlapping the route.

9. The non-transitory computer readable medium of claim 6, wherein the emergency state may be determined based on one of a state of consciousness or progression of labor.

10. The non-transitory computer readable medium of claim 6, wherein the electronic message is transmitted from the first electronic device to the at least one second electronic device by short message service (SMS).

* * * * *